United States Patent [19]
Park et al.

[11] Patent Number: 5,818,653
[45] Date of Patent: Oct. 6, 1998

[54] MULTIPLE-VALUES DIGITAL SIGNAL MAGNETIC RECORDING AND REPRODUCING APPARATUS USING A QAM AND PSK MODULATOR, PILOT SIGNAL AND A VITERBI DECODER

[75] Inventors: Sam-yong Park; Yong-deok Chang, both of Suwon-City, Rep. of Korea

[73] Assignee: Samsung Electronics Co., Ltd., Kyungki-do, Rep. of Korea

[21] Appl. No.: 785,166

[22] Filed: Jan. 13, 1997

Related U.S. Application Data

[63] Continuation of Ser. No. 585,813, Jan. 16, 1996, which is a continuation of Ser. No. 203,235, Feb. 28, 1994, abandoned.

[30] Foreign Application Priority Data

Feb. 27, 1993 [KR] Rep. of Korea ................. 93-3038
Aug. 18, 1993 [KR] Rep. of Korea ................. 93-16068

[51] Int. Cl.$^6$ ................................................. G11B 5/09
[52] U.S. Cl. ............................................ 360/32; 375/261
[58] Field of Search ........................... 360/32, 33.1, 40, 360/29; 375/39, 42, 52, 67, 83, 94, 14, 59, 261, 269, 341, 321; 364/724.1; 371/43; 329/304; 332/103, 104; 341/120; 381/4; 342/201

[56] References Cited

U.S. PATENT DOCUMENTS

| | | | |
|---|---|---|---|
| 4,061,978 | 12/1977 | Motley et al. | 375/14 |
| 4,560,961 | 12/1985 | Kestenbaum | 342/201 |
| 4,873,500 | 10/1989 | Genrich | 332/104 |
| 4,979,052 | 12/1990 | Matsuta et al. | 360/40 X |
| 5,068,752 | 11/1991 | Tanaka et al. | 360/32 |
| 5,095,392 | 3/1992 | Shimazaki et al. | 360/40 |
| 5,233,479 | 8/1993 | Nakatsu et al. | 360/46 X |
| 5,255,127 | 10/1993 | Nakatsu et al. | 360/29 |
| 5,285,479 | 2/1994 | Iwane | 375/59 |
| 5,291,499 | 3/1994 | Behrens et al. | 371/43 |
| 5,341,135 | 8/1994 | Pearce | 341/120 |
| 5,357,574 | 10/1994 | Whitecar | 381/4 |

FOREIGN PATENT DOCUMENTS 614184 7/1994 European Pat. Off. .

Primary Examiner—Andrew L. Sniezek
Assistant Examiner—Patrick Wamsley
Attorney, Agent, or Firm—Sughrue, Mion, Zinn, Macpeak & Seas, PLLC

[57] ABSTRACT

A digital signal magnetic recording and reproducing apparatus includes an encoding portion for convolutionally coding an input digital data, a modulating portion for quadrature-amplitude-modulating and phase-shift-keying-modulating the convolutionally coded digital data, a pilot signal mixer for generating a pilot signal and adding it to the modulated signal, and a recording controller for forming a magnetized signal suitable for a magnetic recording medium from the modulated signal mixed with the pilot signal. The apparatus also includes a reproducing controller for outputting a digital signal, in which distortion and deterioration produced during transmission are corrected, from the magnetized signal reproduced in the magnetic recording medium, a carrier wave restoring portion for generating a clock signal at the carrier signal frequency in response to a pilot signal in the reproduced magnetized signal, a demodulating portion for demodulating the quadrature-amplitude-modulated signal output from the reproducing controller and a decoding portion for outputting original digital data by Viterbi-decoding convolutionally coded data from the demodulating portion. The apparatus increases frequency utilization efficiency by adopting a multiple valued digital modulation method, which is effective in recording in a high density signal. The apparatus is characterized in that the overall signal processing is processed digitally.

6 Claims, 17 Drawing Sheets

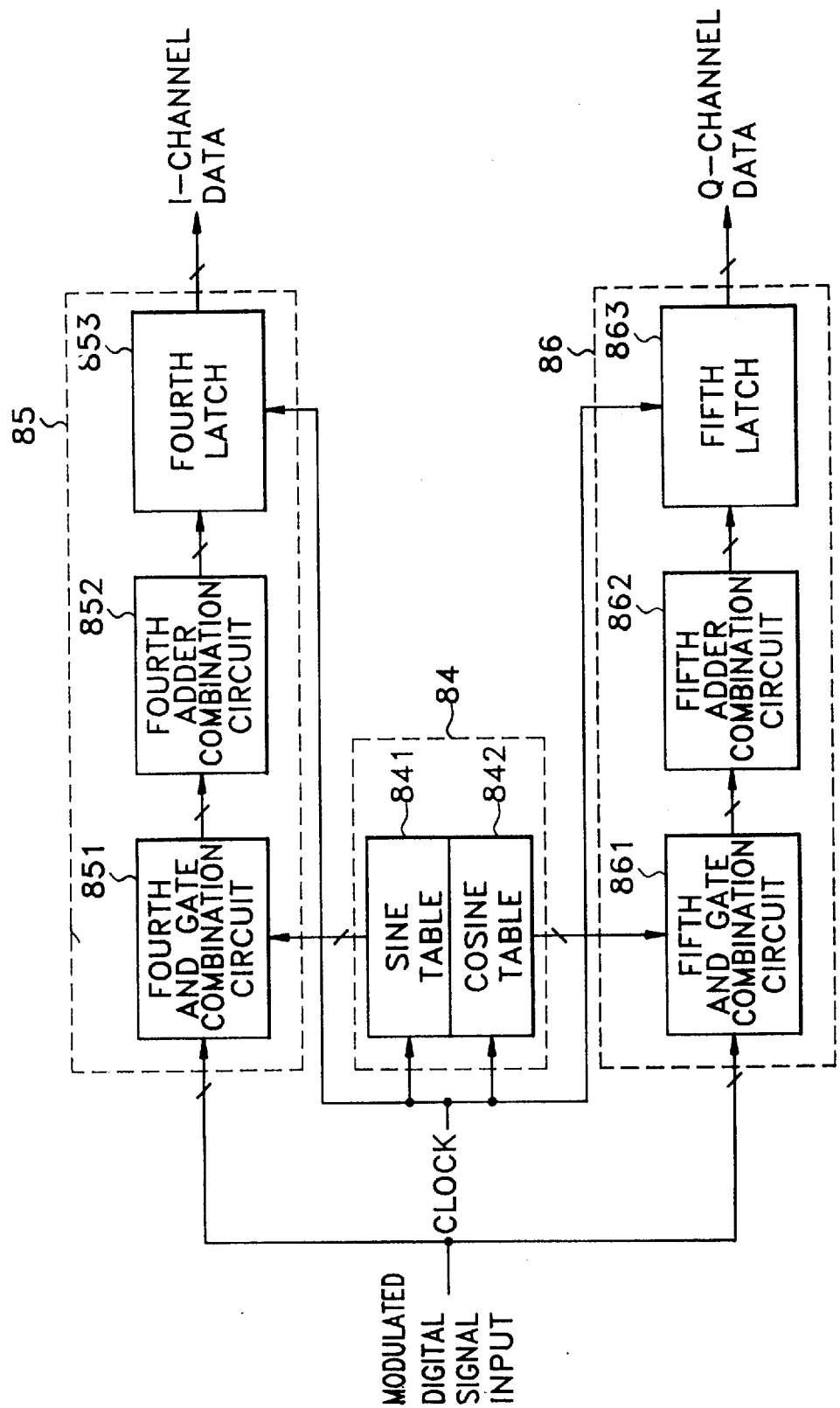

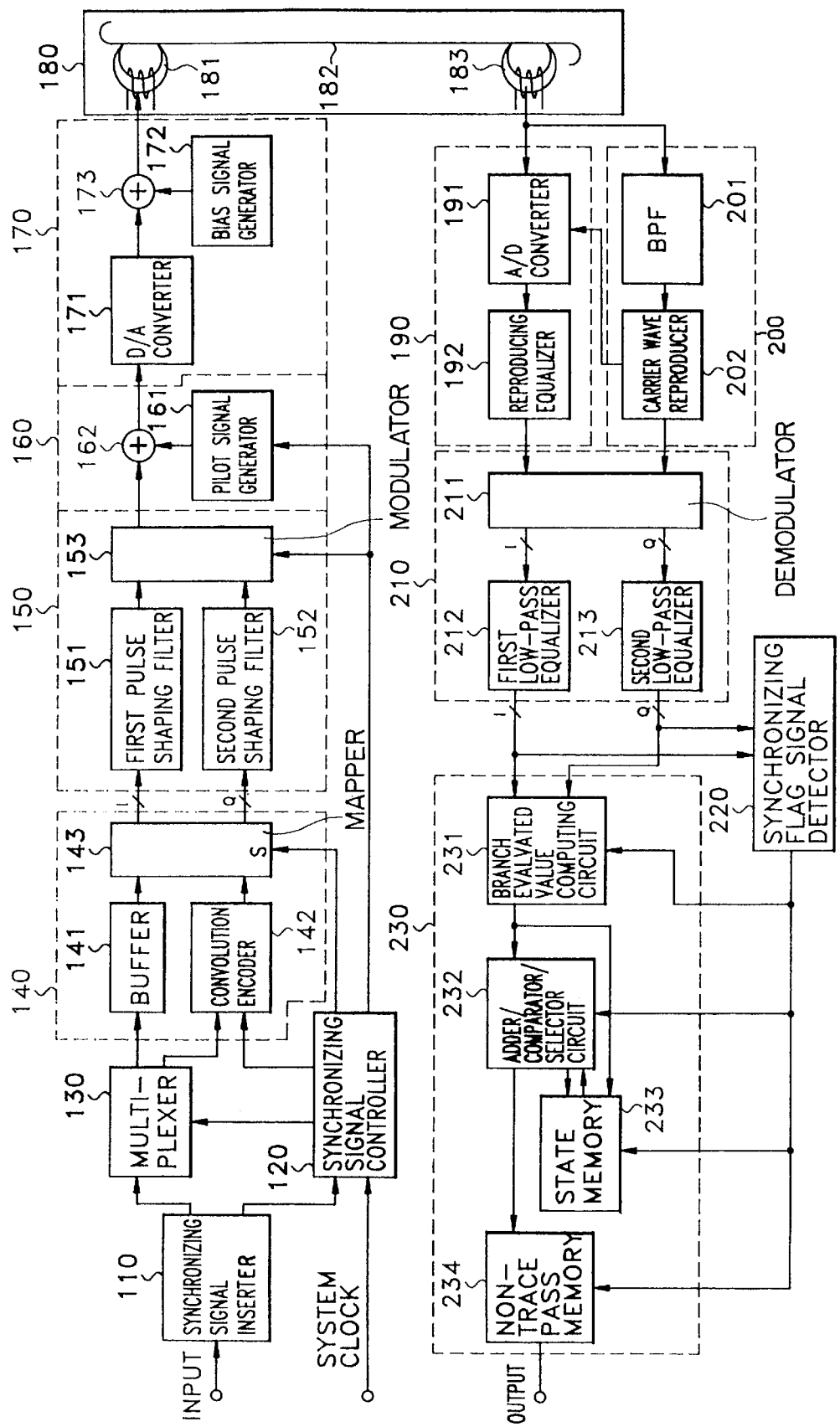

MULTIPLE-VALUES DIGITAL SIGNAL MAGNETIC RECORDING AND REPRODUCING APPARATUS USING A QAM AND PSK MODULATOR, PILOT SIGNAL AND A VITERBI DECODER

This is a continuation of application Ser. No. 08/585,813 filed Jan. 16, 1996, pending which in turn is a continuation of application Ser. No. 08/203,235, filed Feb. 28, 1994, now abandoned.

BACKGROUND OF THE INVENTION

1. Field of the Invention

The present invention relates to a digital signal magnetic recording and reproducing apparatus and, more specifically, to a digital signal recording and reproducing apparatus permitting recording and reproducing of a digital signal at a high-density on the band-restricted channel. The present invention is particularly advantageous in a digital video tape recorder and the like.

Korean Patent Application Nos. 93-3038 and 93-16068 are incorporated herein by reference for all purposes.

2. Brief Discussion of Related Art

Various kinds of digital recording and reproducing methods are being provided for analog signals which are converted to digital signals during signal processing. Although a digital signal magnetic recording and reproducing apparatus, which records and reproduces a digital image signal is excellent in a picture quality and dubbing performance in comparison with an analog magnetic recording and reproducing apparatus, which records and reproduces an analog image signal, the quantity of data to be recorded in a tape may be over ten times as large as that of a comparable analog magnetic recording and reproducing apparatus in recording the same image signal. In other words, by analog-to-digital conversion, the quantity of the signal data in a digital magnetic recording and reproducing apparatus is increased considerably. Accordingly, when a digital signal is recorded, the tape consumption is increased, making it difficult to record a large quantity of signals. Therefore, for the purpose of obtaining the same efficiency as that of analog signal recording, it is necessary to increase a recording efficiency by compressing the digitized data and modulating binary data to the data of multiple-value level and recording the modulated data while improving a bit error rate (BER) by increasing the signal-to-noise ratio (SNR).

Because of the difficulty of recording and reproducing direct current components using a recording and modulating method applicable to a conventional digital magnetic recording and reproducing apparatus, base-band frequency modulating methods such as a non return to zero inverse modulation (NRZI), partial response (PR) modulation, eight-to-fourteen modulation (EFM), etc., have been employed. Such base-band frequency modulating methods convert the zero-run length of the data rows for expressing as binary codes and records the concentrated signal frequency to attain a high-density recording. However, in the base-band frequency modulation method, the signal level to be recorded has only two potential values, which makes a high-density recording difficult because of a low coefficient of utilization of recording frequency bands. Since the tapes are rapidly consumed, a long-play recording is difficult.

Therefore, as a channel coding technology suitable for high-density recording is required, a modulation method, which has been used in the communication field, is changed and applied, in a suitable form for recording and reproduction. This increases the frequency utilization efficiency and improves the recording bit rate without increasing the number of recording channels.

Accordingly, a code modulation method which is performed by combining multiple value modulations and shows a high coefficient of utilization of frequency bands by an error control coding applicable to a digital data transmission has been proposed. Such a code modulation method, which reduces the BER without increasing the band width has been widely used in the communication field.

In order to realize high-density recording, multiple value digital modulation methods such as quadrature amplitude modulation (QAM) and phase shift keying modulation (PSK), etc., used in other communication fields, have been introduced. As a result, a increase in utilizing efficiency of frequency bands for during high-density recording are advantageous.

A digital signal magnetic recording and reproducing apparatus, which uses multiple valued QAM modulation and maximum likelihood decoding is disclosed in U.S. Pat. No. 5,095,392.

The digital signal magnetic recording and reproducing apparatus performs a digital-to-analog conversion at the start, processes the converted signal, converts the processed signal into a multiple value signal at the time of encoding, records the converted multiple value signal, and decodes the signal by maximum likelihood decoding after demodulating the signal recorded in an analog form and finally performs an analog-to-digital conversion.

SUMMARY OF THE INVENTION

An object of the present invention is to provide a digital signal magnetic recording and reproducing apparatus, which can improve recording efficiency by applying a multiple valued digital modulation method applicable to other communication fields.

Another object of the present invention is to provide a digital signal magnetic recording and reproducing apparatus, which can record signals at high-density using quadrature amplitude modulation and phase shift keying modulation while magnetically recording and reproducing a digital signal.

Still another object of the present invention is to provide a digital signal magnetic recording and reproducing apparatus, which processes an overall signal digitally by adopting a multiple value modulation method which possesses both a low error rate and a high recording efficiency.

A further object of the present invention is to provide a digital signal magnetic recording and reproducing apparatus, which reduces bit error rate by inserting a synchronizing signal into an input digital signal and reconstructing the synchronizing signal efficiently.

A still further object of the present invention is to provide a digital signal magnetic recording and reproducing apparatus, which modulates data by the carrier wave synchronized with data by generating a carrier wave using a system clock at the time of modulation and by generating a pilot signal for detecting the carrier wave synchronized at the time of demodulation.

These and other objects, features and advantages according to the present invention are provided by a digital signal magnetic recording and reproducing apparatus which includes:

an encoder for converting an input digital signal into a multiple valued digital signal;

a modulator for quadrature-amplitude-modulating and phase-shift-keying modulating the multiple valued digital signal in accordance with a carrier signal to produce a modulated signal;

a pilot signal mixer for generating a pilot signal and adding the pilot signal to the modulated signal;

a recording controller for forming the modulated signal mixed with the pilot signal into a magnetized signal suitable for a magnetic recording medium;

a reproducing controller for generating a reproduced magnetized signal from the magnetic recording medium as a digital signal form in which the signal distortion and deterioration produced in the transmission system are corrected;

a carrier wave restorer for generating a clock signal having a carrier signal frequency in response to detecting the pilot signal from the reproduced magnetized signal;

a demodulator for demodulating the modulated signal output from the reproducing controller in accordance with the carrier signal restored from the carrier wave restorer; and a decoder for outputting original digital data by Viterbi-decoding the convolutionally coded data from the output of the demodulator.

These and other objects, features and advantages according to another preferred embodiment of the present invention are provided by a digital signal magnetic recording and reproducing apparatus including:

a synchronizing signal inserter for inserting a synchronizing signal to input digital data and outputting a synchronizing flag signal;

an encoder for converting the digital signal received from the synchronizing signal inserter into a multiple valued digital signal;

a synchronizing signal controller for controlling coding of the encoder by receiving the synchronizing flag signal;

a modulator for quadrature-amplitude modulating and phase-shift-keying modulating the multiple valued digital signal in accordance with a carrier signal to thereby provide a modulated signal;

a pilot signal mixer for generating a pilot signal and adding the pilot signal to the modulated signal;

a recording controller for forming the modulated signal mixed with the pilot signal onto a magnetized signal suitable for a magnetic recording medium;

a reproducing controller for outputting the magnetized signal reproduced from the magnetic recording medium as a digital signal in which signal distortion and deterioration produced in a transmission system are corrected;

a carrier wave restorer for generating a clock signal having the carrier signal frequency responsive to detection of the pilot signal from the reproduced magnetized signal;

a demodulator for demodulating the modulated signal output from the reproducing controller in accordance with the carrier signal restored from the carrier wave restorer;

a synchronizing flag detector for restoring a synchronizing flag signal from the demodulated signal; and a decoder for outputting original digital data by Viterbi-decoding the convolutionally coded data from the output of the demodulator in accordance with the synchronizing flag signal.

BRIEF DESCRIPTION OF THE DRAWINGS

The above objects and other advantages of the present invention will become more apparent by describing in detail a preferred embodiment thereof with reference to the attached drawings.

FIG. 9 is a detailed block diagram of the demodulator shown in FIG. 8;

FIG. 10 is a block diagram of another embodiment of the digital signal magnetic recording and reproducing apparatus according to the present invention;

DETAILED DESCRIPTION OF PREFERRED EMBODIMENTS

Hereinbelow, preferred embodiments of the digital signal magnetic recording and reproducing apparatus according to the present invention will be described, with reference to the accompanying drawings.

Figure 1:
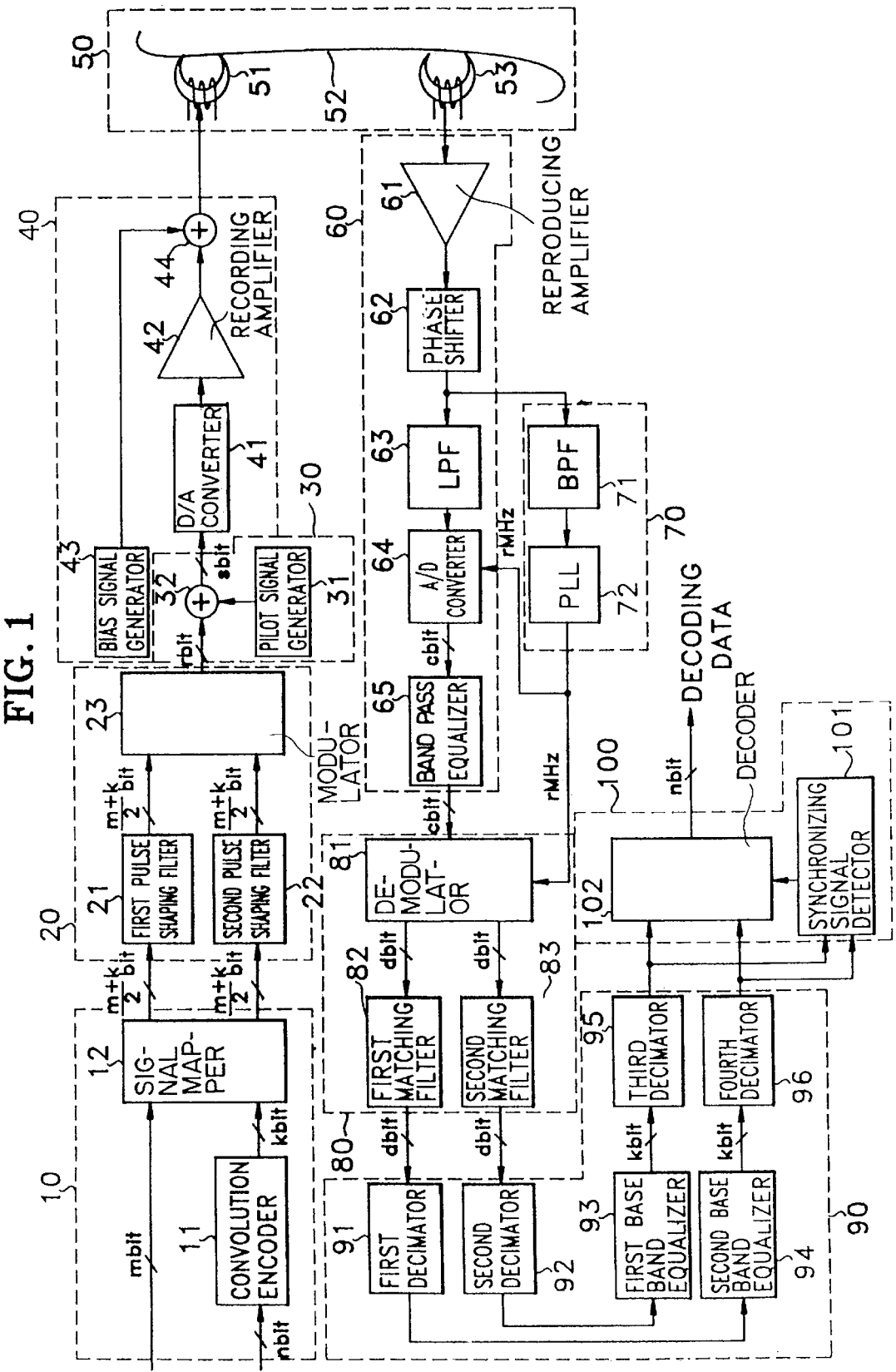
FIG. 1 is a block diagram of an embodiment of a digital signal magnetic recording and reproducing apparatus, according to the present invention.

FIG. 1 is a block diagram of an embodiment of the digital signal magnetic recording and reproducing apparatus, according to the present invention.

A digital signal magnetic recording and reproducing apparatus, according to an embodiment of the present invention advantageously includes:

a coding portion 10 having a convolution encoder 11 for convolutionally coding the digital input data bits and a signal mapper 12 for parallel processing the outputs of the convolution encoder 11 simultaneously according to the number of the necessary bits;

a modulating portion 20 having first and second pulse shaping filters 21 and 22 for band-restricting the output of the signal mapper 12 and a modulator 23 for modulating the outputs of the first and second pulse shaping filters 21 and 22;

a pilot signal mixer 30 having a pilot signal generator 31 for generating a pilot signal and an adder 32 for adding the pilot signal to the data provided by modulator 23;

a recording controller 40 having a digital-to-analog (D/A) converter 41 for converting the output of adder 32 into an analog signal, a recording amplifier 42 for amplifying the output of the D/A converter 41, a bias signal generator 43 for generating a bias signal and a second adder 44 for adding the bias signal to the output of the recording amplifier 42;

a magnetic recording and reproducing portion 50 having a recording head 51 for recording the output of the second adder 44 in a magnetic recording medium 52 as a magnetized signal and a reproducing head 53 for reproducing the magnetized signal recorded in the magnetic recording medium 52;

a reproducing controller 60 having a reproducing amplifier 61 for amplifying the signal reproduced by the reproducing head 53, a phase shifter 62 for shifting a phase of the output of the reproducing amplifier 61, a low pass filter 63 for detecting a reproduced signal which is quadrature amplitude-modulated from the output of the phase shifter 62, an analog-to-digital (A/D) converter 64 for converting the output of the low-pass filter 63 into digital signal form and a band-pass equalizer 65 for equalizing the output of the A/D converter 64;

a carrier wave restorer 70 having a band-pass filter 71 for detecting the pilot signal from the output of the phase shifter 62 and a phase locked loop (PLL) 72 for detecting a clock signal having the same frequency as that of the carrier signal from the outputs of band-pass filter 71;

a demodulating portion 80 having a demodulator 81 for demodulating the output of the band-pass equalizer 65 and first and second matching filters 82 and 83 for restricting the output bands of the demodulator 81;

a noise eliminator 90 having first and second decimators 91 and 92 for decimating the outputs of the first and second matching filter 82 and 83 for improving a signal-to-noise (S/N) ratio, first and second base-band equalizers 93 and 94 for equalizing the outputs of the first and second decimators 91 and 92 and third and fourth decimators 95 and 96 for redecimating the outputs of the first and second base-band equalizers 93 and 94; and a decoding portion 100 having a synchronizing signal detector 101 for detecting a synchronizing signal from the outputs of the third and fourth decimators 95 and 96 and a decoder 102 for decoding the outputs of the third and fourth decimators 95 and 96 in accordance with the detected synchronizing signal.

The operation of the digital signal magnetic recording and reproducing apparatus shown in FIG. 1 will now be described.

According to FIG. 1, the input data bits are output as k bits through the convolution encoder 11, with m bits not coded and n bits coded at a ratio of n/k. It will be noted that convolution code is a non-block signal, which permits previous data to influence subsequent data and which has an excellent capability for correcting burst errors. However, use of the convolution encoder 11 together with a signal mapper 12 is somewhat akin to block coding.

Conventionally, the coding portion and the modulating portion have been treated separately, but the present invention uses the serially linked convolution encoder and modulator like Ungerboeck's Trellis Coded Modulation (TCM). Ungerboeck's channel coding method enhances a coding gain by reducing the detecting error of a Viterbi decoder at the time of coding and by maximizing the Euclidean distance between signals. In other words, to avoid a conventional method of performing coding and modulation separately, which is Ungerboeck's channel coding method, a convolution coding is performed so as to provide a maximum Euclidean distance on a phase diagram of a modulated signal by establishing a mutually organic relationship between coding and modulation. Therefore, k bits output from the convolution encoder 11 are coded at a maximum Euclidean distance among the codes, thereby minimizing a detection error at the time of decoding.

When the coded k bits and non-coded m bits are input to the signal mapper 12, they are changed into m+k bits suitable for being modulated, separated into (m+k)/2 portions and finally input as in-phase (I) and quadrature-phase (Q) channels of first and second pulse shaping filters 21 and 22, respectively. Here, many more bits than m+k bits can be given as additional bits.

The first and second pulse shaping filters 21 and 22 are preferably formed by low-pass filters and perform band restriction and wave shaping to eliminate inter-symbol interference (ISI). In other words, the signal quadrature-amplitude-modulated and phase-shift-keying-modulated by the modulator 23 is output as r bits after passing through first and second pulse shaping filters 21 and 22, which are band-restricted within base-band frequencies in order to prevent an internal modulation.

The pilot signal generator 31 generates a pilot signal having a frequency of 2 fc, which is double the frequency of a carrier wave (fc), for restoration of a carrier wave and outputs it to a first input terminal of adder 32, which adds the pilot signal to an r-bit modulated signal and outputs an s-bit signal.

The D/A converter 41 converts the output of adder 32 into an analog signal and amplifies it in a recording amplifier 42. The bias signal fB generated in a bias signal generator 43 is recorded in a recording signal band so as to have the following relationship with a maximum frequency fH, as described in equation (1).

$$fB \geq 3fH \qquad (1)$$

The second adder 44 adds the output signal from recording amplifier 42 to the bias signal to record the added signal on a magnetic recording medium 52 as a magnetized signal via recording head 51. The bias signal is a signal for correcting a hysteresis characteristic of the magnetized signal.

The demodulating process is performed in the inverse sequence as that of the above described modulation process. After a modulated signal recorded in the magnetic recording medium 52 is reproduced by a reproducing head 53, the reproduced signal is amplified in a reproducing amplifier 61.

A phase shifter 62 shifts the phase of the signal reproduced from the reproducing amplifier 61 by 90° to compensate for the 90° phase shift which is due to the differential characteristic of a magnetic channel at the time of recording. A low-pass filter 63 detects a base-band frequency wherein a modulated signal is loaded, from the output of the phase shifter 62. An A/D converter 64 converts the output of the low-pass filter 63 into a c-bit digital signal form and inputs it to a demodulator 81 through band-pass equalizer 65, which corrects for signal distortion and deterioration, which characteristic errors are generated in the transmission system.

Preferably, band-pass filter 71 detects a band wherein a pilot signal is loaded, the signal having been amplified by reproducing amplifier 61, and PLL 72 detects an r MHz modulation clock signal, i.e., a carrier wave, from the output of band pass filter 71 and inputs it to converter 64 and demodulator 81.

The demodulator 81 receives, as its input, the output of the band-pass equalizer 65 and the output clock of PLL 72, and generates first and second carrier signals and outputs I and Q channel data by balance-modulating the carrier signals. Therefore, the demodulator 81 outputs the demodulated signals of two channels having d bits forming convolutionally coded data.

First and second matching filters 82 and 83 restrict the output bands of the demodulator 81. These matching filters preferably are devices for prohibiting modulation from being involved in the inter-symbol interference in accordance with the characteristics of first and second pulse shaping filters 21 and 22 at the time of modulation. The inter-symbol interference is generated from a reproduced signal by a frequency characteristic of a magnetic recording and reproducing portion 50. Therefore, the convolutionally coded data from demodulator 81 are band-restricted through first and second matching filters 82 and 83, thereby eliminating noise and improving the signal-to-noise (S/N) ratio.

First and second decimators 91 and 92 decimate the outputs of first and second matching filters 82 and 83. Band restriction and clock frequency reduction is produced by first and second matching filters 82 and 83 and first and second decimators 91 and 92, respectively. First and second baseband equalizers 93 and 94 equalize two signals of I and Q channels of first and second decimators 91 and 92. Third and fourth decimators 95 and 96 redecimate the outputs of first and second base-band equalizers 93 and 94 and output them to both a synchronizing signal detector 101 and a decoder 102.

It should be noted that signal addition and clock frequency reduction is produced by a portion of first and second base-band equalizers 93 and 94 and third and fourth decimators 95 and 96, respectively. The reason why decimation is performed twice is to provide system stability by lowering the clock frequency.

A synchronizing signal detector 101 detects a synchronizing signal from the outputs of third and fourth decimators 95 and 96 and outputs it to decoder 102, which decodes the demodulated signal of I and Q channels in accordance with the synchronizing signal. Preferably, a Viterbi decoder is employed as the decoder. In other words, the decoder 102 performs decoding by selecting the path of which the Hamming distance of the received data series is shortest by maximum likelihood decoding (MLD).

Figure 2:
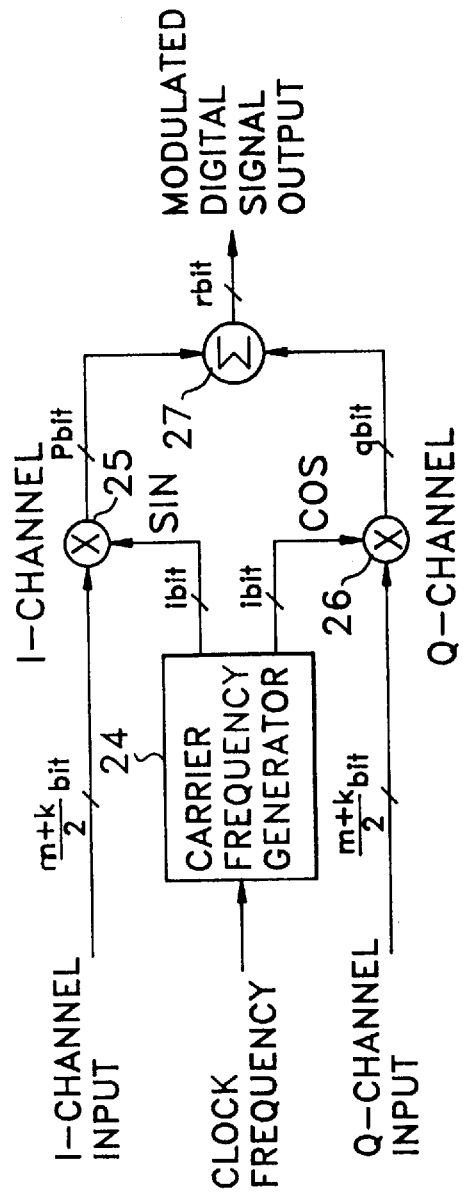
FIG. 2 is a view which is useful in explaining the concept of the modulator shown in FIG. 1.

FIG. 2 is a view for explaining the concept of the modulator as shown in FIG. 1.

Referring to FIG. 2, if data is separately input to I and Q channels, first and second carrier signal (the respective signal having a 90° phase difference) are multiplied by the data and two signals are added. A, quadrature amplitude- and phase-shift-keying-modulated signal is output.

Conventionally, such a signal processing as stated above is performed using analog processing, while in the present invention, signal processing is performed digitally, thereby decreasing signal distortion due to a noise and environmental conditions. In other words, the modulator 23 shown in FIG. 1 is a quadrature amplitude modulator (QAM), which generates a carrier signal in a first carrier frequency generator 24 in accordance with a system clock frequency, as shown in FIG. 2.

The first carrier signal $C_1(t)$, which can be expressed in the following equation (2), generates an i-bit signal and outputs it to a first balanced-modulator 25.

$$C_1(t)=A \cdot SIN \omega c \cdot t \qquad (2)$$

The first balanced-modulator 25 balance-modulates a (m+k)/2 bit signal output to an I channel from the first pulse shaping filter 21 and a first carrier signal and outputs a p-bit signal to a first input terminal of the third adder 27.

Preferably, a second carrier signal $C_2(t)$ having a phase difference of ±90° from that of first carrier signal $C_1(t)=A \cdot SIN \omega c \cdot t$, which is also generated from carrier frequency generator 24, can be expressed in the following equation (3) and a second balance modulator 26 balanced modulates a second carrier signal and a (m+k)/2 bit signal which is output to a Q channel from the second pulse shaping filter 22 and outputs a q-bit signal to a second input terminal of the third adder 27.

$$C_2(t)=A \cdot COS \omega c \cdot t \qquad (3)$$

Assuming that the output of third adder 27 is S(t), S(t) can be expressed in the following equation (4) and is output to a second input terminal of the first adder 32 as an r-bit signal.

$$S(t)=(m+k)/2 \cdot A \cdot COS \omega c \cdot t + (m+k)/2 \cdot A \cdot SIN \omega c \cdot t \qquad (4)$$

Figure 3:
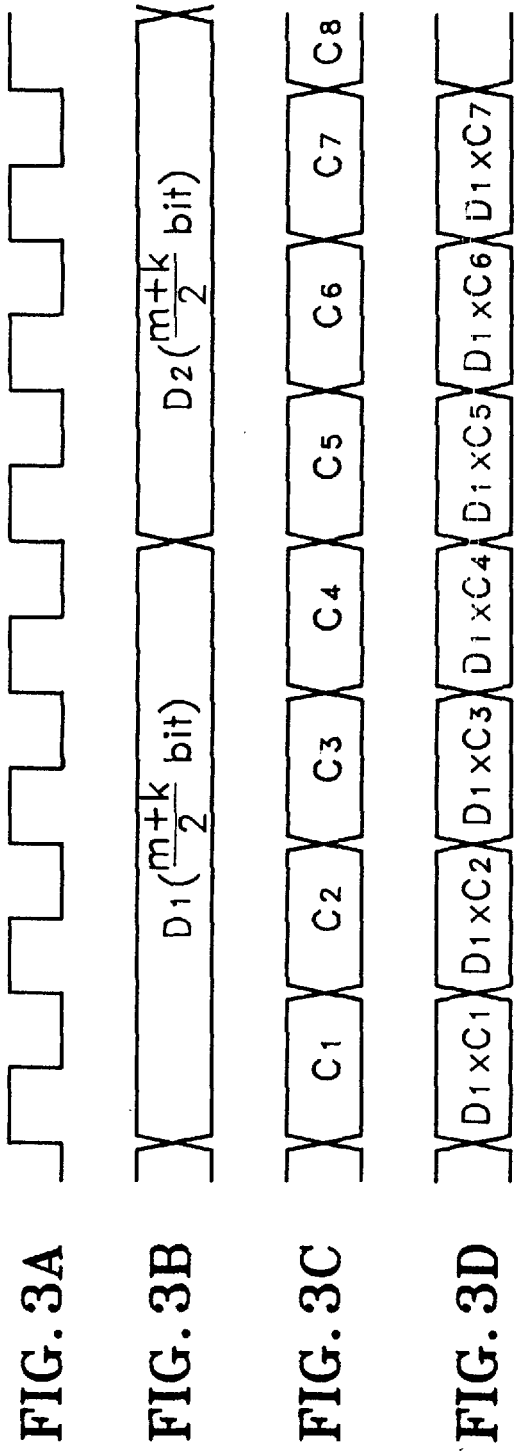
FIGS. 3A to 3D are operational timing charts of the modulator shown in FIG. 2.

FIG. 3A shows a modulating clock used for modulation, FIG. 3B illustrates parallel input of (m+k)/2 bits of the I channel, FIG. 3C shows a first carrier signal which is input in parallel as i bits, and FIG. 3D shows quadrature-amplitude-modulated data which is output from third adder 27. Although only modulated signals of the I channel are illustrated in FIGS. 3A to 3D, it should be noted that such modulation is performed on both I and Q channels at the same time.

Figure 4:
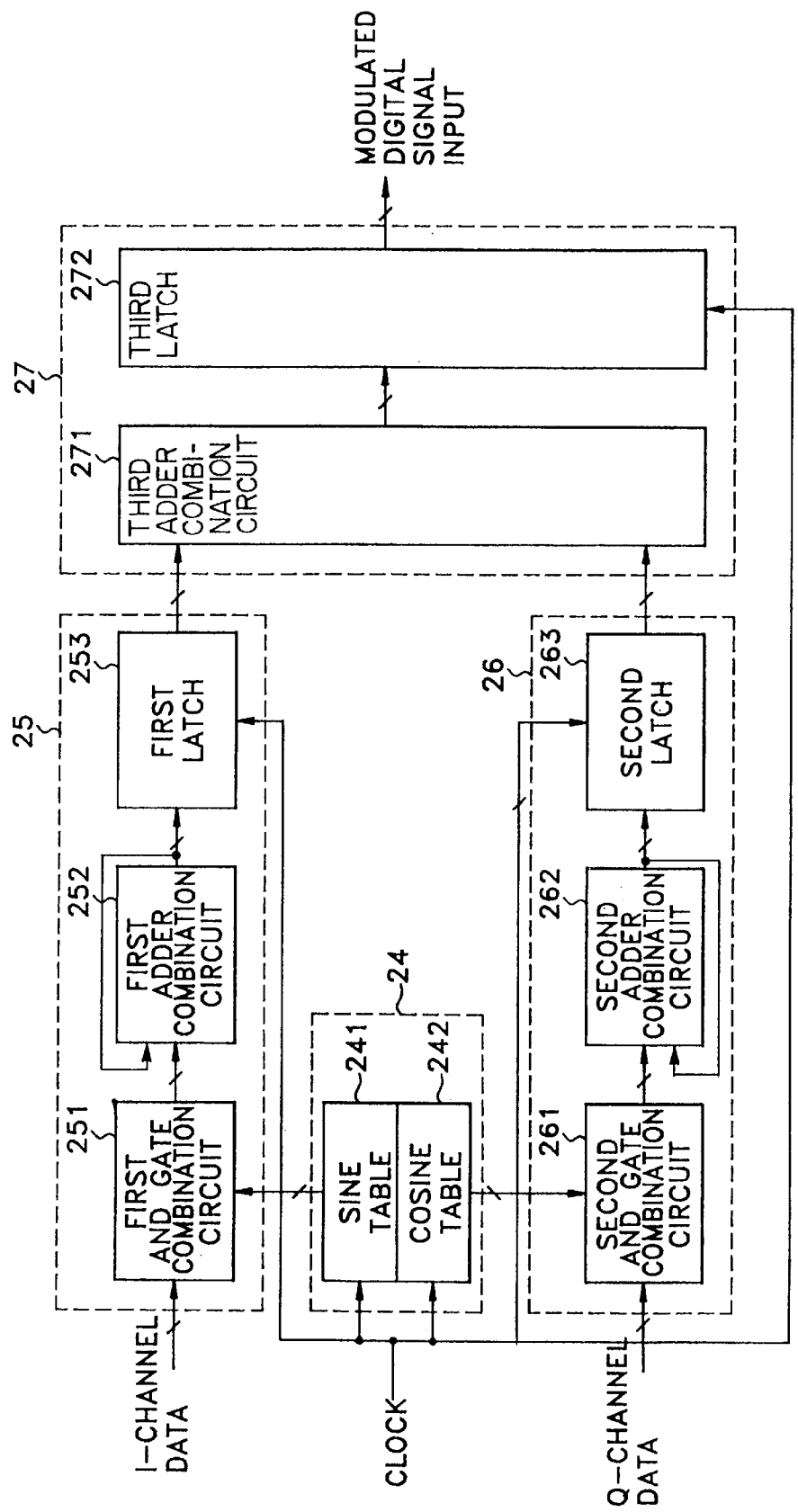
FIG. 4 is a detailed block diagram of the modulator shown in FIG. 2.

FIG. 4 is a block diagram of the modulator embodied in the present invention using the concept of the modulator shown in FIG. 2. A characteristic of the modulator according to the present invention is that the modulated signal processing steps are processed in digital signals from an input to an output.

The modulator shown in FIG. 4 advantageously includes:
a first carrier signal generator 24 having a first ROM 241, wherein a first carrier signal which can be expressed in such sine components as the equation (2) is stored, and a second ROM 242, wherein a second carrier signal which can be expressed in such cosine components as the equation (3) is stored;

a first balanced-modulator 25 having a first AND gate combination circuit 251 for combining the I channel data output from the first pulse shaping filter 22 and a first carrier signal output from the first ROM 241, a first adder combination circuit 252 for adding the output of the first AND gate combination circuit 251 and a first latch 253 for temporarily storing the output of the first adder combination circuit 252;

a second balanced-modulator 26 having a second AND gate combination circuit 261 for combining the Q channel data output from the second pulse shaping filter 23 and a second carrier signal output from the second ROM 242, a second adder combination circuit 262 for adding the outputs of the second AND gate combination circuit 261 and a second latch 263 for temporarily storing the output of the second adder combination circuit 262; and a third adder 27 having a third adder combination circuit 271 for adding the outputs of the first and second latches 253 and 263, that is, the p-bit modulated signal of the I channel to the q-bit modulated signal of the Q channel and a third latch 272 for temporarily storing the output of the third adder combination circuit 271, that is, the r-bit quadrature-amplitude-modulated signal.

Figure 5:
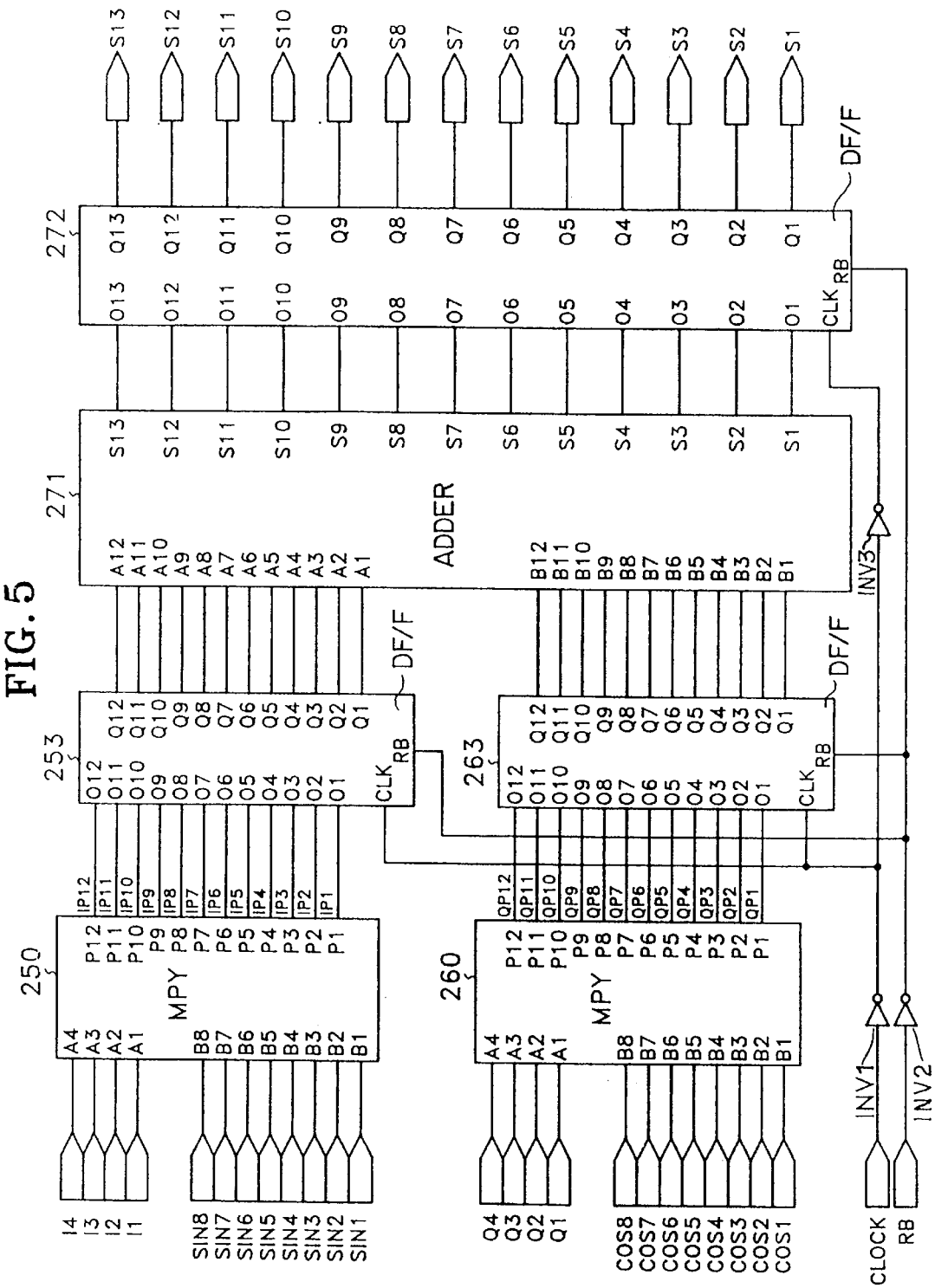
FIG. 5 is a detailed circuit diagram of the modulator shown in FIG. 4.

FIG. 5 is a detailed circuit diagram of the modulator shown in FIG. 4, wherein a first multiplier 250 corresponds to the first AND gate combination circuit 251 and first adder combination circuit 252 shown in FIG. 4 and a second multiplier 260 corresponds to the second AND gate combination circuit 261 and second adder combination circuit 262. First to third latches 253, 263 and 272 are constituted by D flip-flops and a third adder combination circuit 271 corresponds to third adder 27.

Now, the operation of FIG. 4 will be explained in connection with FIG. 4 through FIG. 7C.

Referring to FIG. 4, if the input digital data are separated into I and Q channels, respectively, and input to first and second AND gate combination circuits 251 and 261, the digital data (the first carrier signal) having the sine components from first ROM 241 and the I channel data are multiplied in the first AND gate combination circuit 251 and first adder combination circuit 252 and are then latched to first latch 253.

The digital data (the second carrier signal) having cosine components from second ROM 242 and the Q channel data are multiplied in second AND gate combination circuit 261 and second adder combination circuit 262 and are then latched to second latch 263.

The third adder combination circuit 271 combines the I and Q signals and generates a quadrature-amplitude-modulated signal through the third latch 272. The input data Di and carrier Ci are multiplied to generate an output Mi. Here, a reference letter i denotes integers ranging from 1 through n.

Figure 6:
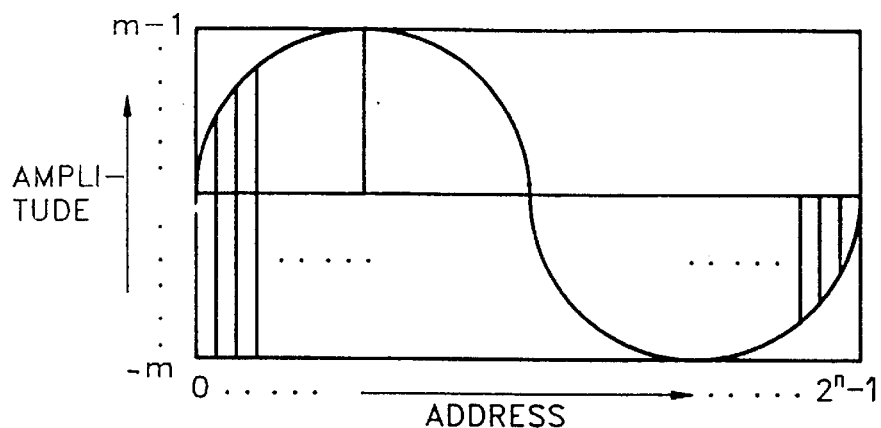
FIGS. 6A to 6C are views for explaining a carrier signal of sine components stored in the first ROM shown in FIG. 5.
Figure 7:
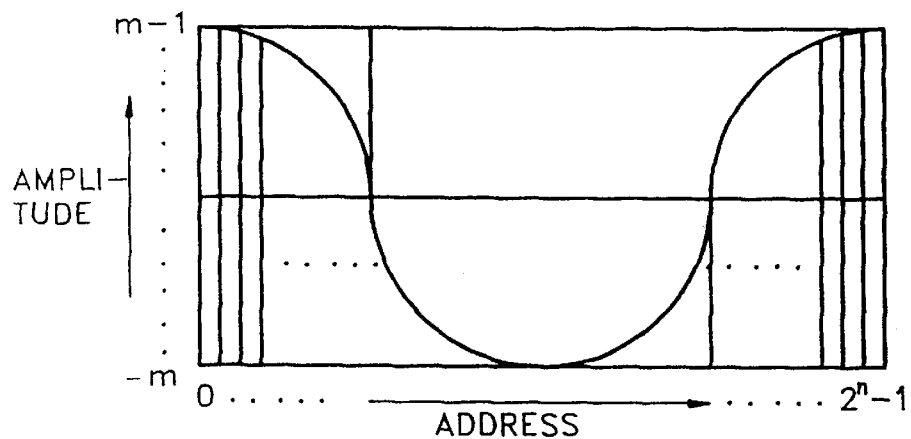
FIGS. 7A to 7C are views for explaining a carrier signal of cosine components stored in the second ROM shown in FIG. 5.

Here, the composition examples of the carrier frequencies indicating a digital composition method are shown in FIGS. 6A to 7C. For example, FIG. 6A shows that a carrier frequency having a waveform of 5.332 MHz digitally. In FIG. 6A, which illustrates a wavelength of first carrier signal C1(t) having K MHz frequency, the abscissa indicates address numbers 0 to $2^n-1$ and the ordinate indicates quantizing levels with respect to amplitudes. When address and amplitude are quantized into 10 bits and 4 bits, respectively, a table as shown in FIG. 6B is obtained. FIG. 6B explains the relationship between addresses and amplitudes, which is expressed in an equation, $y = \sin(2^{n-2}/90) \cdot m$. Here, y indicates an equidistance between amplitudes. Thus, if the table is read by a clock of 26 MHz, only about 4.876 data values are read, since 26 MHz/5.332 MHz = 4.876.

The result is as follows. 1024/4.876=210. That is, 1024 addresses are continuously read at an interval of 210 addresses. If such operations are repeated, the same value as that of the initially read address is read again at the 513th operation. Then, the rest of the 512 values are discarded and only the repetitive 512 values are taken to form the table using a ROM, which corresponds first ROM 241.

FIG. 6C indicates such a table formed by the above relationship. As indicated in the table, whenever a clock signal is received, sequentially repetitive signals are read from the actual addresses 0 through 511.

FIG. 7A illustrates a wavelength of second carrier signal C2(t) having K MHz frequency, where the abscissa indicates address numbers 0 to $2^n-1$ and the ordinate indicates quantizing levels with respect to amplitudes. FIG. 7B shows a relationship between address and amplitude, where y indicates a given variation of the amplitude as every address is increased by one. As indicated in the table shown in FIG. 7C by such a relationship, whenever a clock signal is received, sequentially repetitive signals are read from the actual addresses 0 through 511 and the value stored in the address becomes a second carrier signal of the cosine components, which is stored in a second ROM 242.

Figure 8:
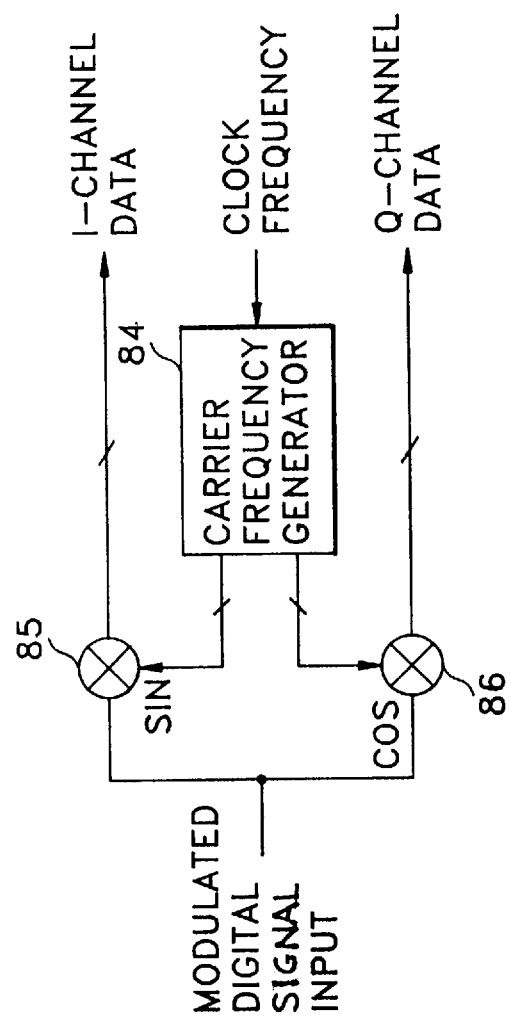
FIG. 8 is a view for explaining the concept of the demodulator shown in FIG. 1.

FIG. 8 is a drawing for explaining the concept of the demodulator 81 shown in FIG. 1. It will be appreciated that the operation thereof is performed in the inverse order to that of the modulator 23.

Referring to FIG. 8, the input modulated signal is input to a first input of third and fourth balanced-modulators 85 and 86.

First and second carrier signals, which are generated from a second carrier frequency generator 84 by a clock frequency having the input frequency of fc, are input to a second input of third and fourth balanced-modulators 85 and 86, respectively. The second carrier signal can be expressed as cosine components input to the fourth balanced-modulator 86 phase-shifted by 90°, in contrast to the first carrier signal which is expressed in the sine components. The modulated input signals are balance modulated in the third and fourth balanced-modulators 85 and 86, respectively, by two carrier signals.

FIG. 9 is a detailed block diagram of the demodulator used in another embodiment of the present invention shown in FIG. 1, wherein a second carrier frequency generator 84 corresponds to a third ROM 841 wherein a first carrier signal, which can be expressed as sine components, is stored and a fourth ROM 842 wherein a second carrier signal to be expressed in cosine components is stored. The signals stored in these ROMs are the same as those stored in first and second ROM 241 and 242, as discussed above in connection with FIGS. 6A to 7C.

The third balanced-modulator 85 corresponds a fourth AND gate combination circuit 851 for combining the modulated signal output from band-pass equalizer 65 and the first carrier signal output from the third ROM 841, a fourth adder combination circuit 842 for adding the output of the fourth AND gate combination circuit 851 and a fourth latch 853 for temporarily storing the output of the fourth adder combination circuit 852. The fourth AND gate combination circuit 851 and a fourth adder combination circuit 852 advantageously can be provided by multipliers.

A fourth balanced-modulator 86 corresponds to a fifth AND gate combination circuit 861 for combining the modulated signal output from band-pass equalizer 65 and the second carrier signal output from the fourth ROM 842, a fifth adder combination circuit 862 for adding the output of the fifth AND gate combination circuit 861 and a fifth latch 863 for temporarily storing the output of the fifth adder combination circuit 862. The fifth AND gate combination circuit 861 and a fifth adder combination circuit 862 can be constituted by multipliers.

FIG. 10 is a block diagram of the digital signal magnetic recording and reproducing apparatus according to another embodiment of the present invention, which preferably includes:

a synchronizing signal inserter 110 for inserting a synchronizing signal to input digital data;

a synchronizing signal controller 120 for synchronizing an overall recording system;

a multiplexer 130 for selectively providing the output of the synchronizing signal inserter 110 in accordance with a synchronizing flag signal output from the synchronizing signal controller 120;

a coding portion 140 having a buffer 141 for temporarily storing first bits which are parallel transferred among data output from the multiplexer 130, a convolution encoder 142 for coding data of second bits among the data output from the multiplexer 130 taking into account coding gain and bit error rate, and a mapper circuit 143 for setting the relationship between signal points through the convolution encoder 142 so that a coding gain becomes large during decoding;

a modulating portion 150 having first and second pulse shaping filters 151 and 152 for restricting base-band widths of the I and Q channel data output from the mapper circuit 143, thereby removing an inter-symbol interference, and a modulator 153 for generating a carrier wave using a ROM table and for quadrature-amplitude-modulating and phase-shift-keying-modulating the output of two channels from the mapper circuit 143 using the carrier wave;

a pilot signal mixer 160 having a pilot signal generator 161 for facilitating demodulation in synchronization with a carrier frequency and a first adder 162 for adding the pilot signal to the modulated data output of modulator 150;

a recording controller 170 having a digital-to-analog (D/A) converter 171 for converting the output of the first adder 162 to an analog signal, a bias signal generator 172 for utilizing a linear component of a magnetization characteristic curve compensating for non-linear characteristics of magnetic channels and a second adder 173 for adding a bias signal from the bias signal generator 172 to the output of the D/A converter 171;

a magnetic recording and reproducing portion 180 having a recording head 181 for recording the output of the second adder 173 on a magnetic recording medium 182 as a magnetized signal as well as a reproducing head 183 for reproducing the magnetized signal recorded on the magnetic recording medium 182;

a reproducing controller 190 having an analog-to-digital (A/D) converter 191 for A/D converting a signal reproduced by the reproducing head 183 and a reproducing equalizer 192 for correcting both a phase by the differential characteristics of the magnetic channels for the reproduced signal and signal amplitude attenuation;

a carrier wave restoring portion 200 having a band-pass filter 201 for detecting frequency bands wherein a pilot signal is loaded from the signal reproduced from the reproducing head 183 and a carrier wave reproducer 202, preferably including a PLL, for detecting a clock signal having the same frequency as that of the carrier signal from the output of the band-pass filter 201;

a demodulating portion 210 having a demodulator 211 for demodulating the modulated signal to the I and Q channel data using the reproduced carrier wave and first and second low-pass equalizers 212 and 213 for amplitude- and phase-correcting the output of the demodulator 211;

a synchronizing flag detector 220 for restoring a synchronizing flag signal from the signal demodulated from the first and second low-pass equalizers 212 and 213; and a Viterbi decoder 230 having an evaluated branch value computing circuit 231 for computing the evaluated amount for respective branches of the I and Q channel data demodulated from the first and second low pass equalizers 212 and 213, an adder/comparator/selector circuit 232 for comparing the evaluated branch values according to the respective states of the Trellis diagram indicated in a time scale and selecting the lowest value of the evaluated values, a state memory 233 for storing the output of the adder/comparator/selector circuit 232 and a non-trace pass memory 234 for decoding the information on the survival paths in accordance with the respective states.

Now, the operation of the digital signal magnetic recording and reproducing apparatus shown in FIG. 10 will be explained with reference to FIGS. 11A to 11F.

Figure 11A:
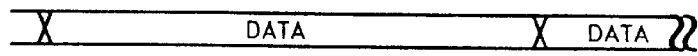
FIGS. 11A to 11F are operational timing charts of digital signal magnetic recording and reproducing apparatus shown in FIG. 1.
Figure 11B:
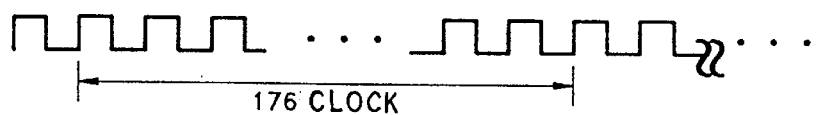
Figure 11C:
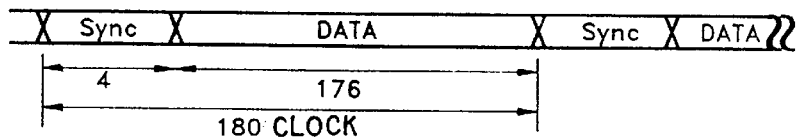

If such m-bit digital data as shown in FIG. 11A are input to a synchronizing signal inserter 110, a synchronizing signal is inserted in the digital data in accordance with the system clock shown in FIG. 11B and then output as a signal in the form shown in FIG. 11C for input to multiplexer 130.

The signal (FIG. 11C) to which a synchronizing signal has been added by means of the synchronizing signal inserter 110 is output as n bits through the multiplexer 130. Among the output bits, (n−2) bits are parallel shifted for input to buffer 141 and the final two bits are input to a convolution encoder 142.

Figure 11D:
Figure 11E:
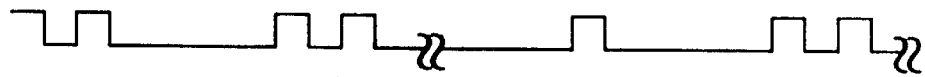

A synchronizing flag signal output from the synchronizing signal inserter 110, as shown in FIG. 11D, is synchronized to the system clock shown in FIG. 11B to be input to a synchronizing signal controller 120, which is the recording system synchronization circuit. The synchronizing signal controller 120 outputs a clock signal, which is "low" during an interval where a synchronizing signal is loaded and which is "normal" during a valid data interval, to the convolution encoder 142, as shown in FIG. 11E.

Figure 11F:
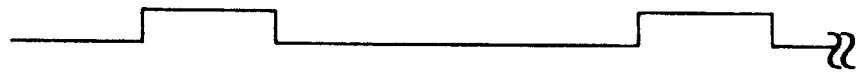

The data output through the multiplexer 130 are input to the mapper circuit 143 through a convolution encoder 142 while the synchronizing flag signal shown in FIG. 11F is "low (0)" and the convolution encoder 142 does not operate while the synchronizing flag signal is "high (1)". If the "high (1)" state synchronizing flag signal is input to the terminal S of the mapper circuit 143, the synchronizing signal is mapped at the origin of a signal constellation diagram, as discussed in great detail below.

The signals separated into the I and Q channels through the mapper circuit 143 are input to modulator 153 through first and second pulse shaping filters 151 and 152 which do not have an inter-symbol interference (ISI) and which restricts the bands suitably to the band width of the magnetic channels. Preferably, the structure and operation of modulator 153 are the same as those of the modulator 23 already explained with respect to FIGS. 2 to 7. The signal input to the modulator 153 is balanced-modulated with the carrier wave signal synchronized by the system clock (FIG. 11B) and the output of the modulator 153 is then added to the pilot signal, which has a frequency twice that of a carrier wave, and which is generated in pilot signal generator 161, in first adder 162.

The pilot signal generator 161 is a circuit providing information necessary for demodulating the signal by reproducing the pilot signal and synchronizing the reproduced signal through the synchronized carrier wave generator 202 when the signal is demodulated. The carrier wave generator 202 advantageously includes a phase locked loop (PLL).

Figure 12:
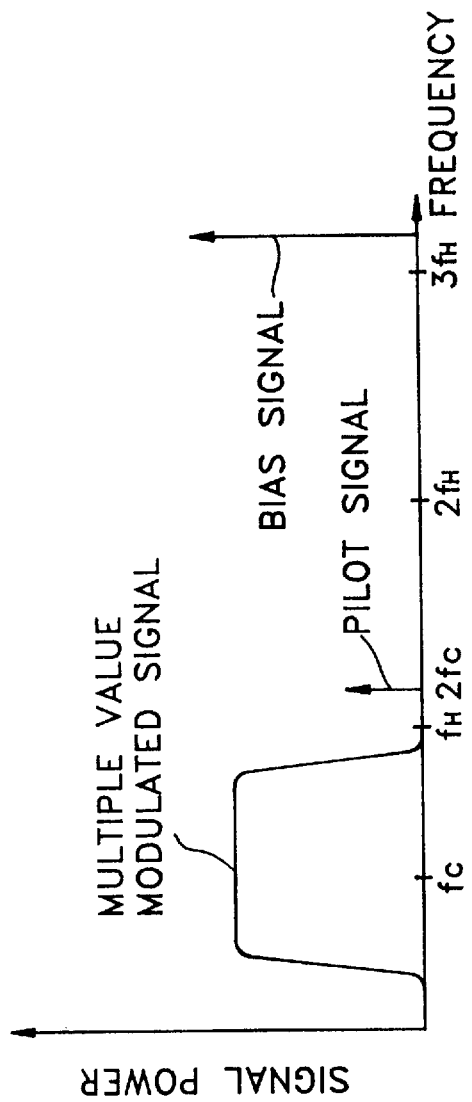
FIG. 12 is a view which is useful in explaining the frequency characteristics of signals recorded in a magnetic recording medium by means of the apparatus shown in FIG. 10.

The modulated signal to which the pilot signal is added, is converted to an analog signal through a D/A converter 171. The bias signal, having a frequency three times greater than that of the modulated signal in the bias signal generator 172, is added to the modulated signal converted to an analog signal, so as to be output to record the signal on the magnetic recording channel using a linear component on the magnetized characteristic curve of a magnetic channel. The frequency spectrum of the signal recorded on the magnetic recording channel is as shown in FIG. 12.

Among the signals reproduced through the magnetic recording medium 182, the pilot signal is detected by a band-pass filter 201. A carrier wave regenerator 202 reproduces a carrier wave in synchronization with the reproduced signal and provides it to the demodulator 211.

Preferably, the signal reproduced through the magnetic channel (the magnetic recording medium) is converted to the digital data through the A/D converter 191 and the signal distorted due to the channel is compensated for through the reproducing equalizer 192 prior to input to the demodulator 211. The reproducing equalizer 192 advantageously is composed of a 90° phase correcting circuit having the differential characteristic of the magnetic channel and an amplitude correcting circuit for correcting an amplitude attenuation of a signal. The output of the reproducing equalizer 192 is multiplied with the carrier wave reproduced by the carrier wave reproducer 202 to be demodulated in the demodulator 211. The frequency and the phase of the signal are compensated through first and second low-pass equalizers 212 and 213 and then decoded through a Viterbi decoder 230.

A synchronizing flag detector 220 controls the Viterbi decoder 230 by detecting a synchronizing flag signal from the demodulated signal output from first and second low-pass equalizers 212 and 213 and decodes the original data by blocking output of the value of a non-trace pass memory 234 while the synchronizing flag signal is "high (1)".

The I and Q data input to the Viterbi decoder 230 are calculated as the evaluated values for respective branches by the branch evaluated value computing circuit 231 and transmitted to adder/comparator/selector circuit 232 and state memory 233. The branch evaluated value computing circuit 231, which computes an evaluated value with input data and coded data, computes all the values of the I and Q channels, respectively, squares the respective values, adds the I and Q values having a signal point on a signal constellation diagram and extracts their square roots. It will be appreciated that all of 32 signal points are computed.

Figure 16:
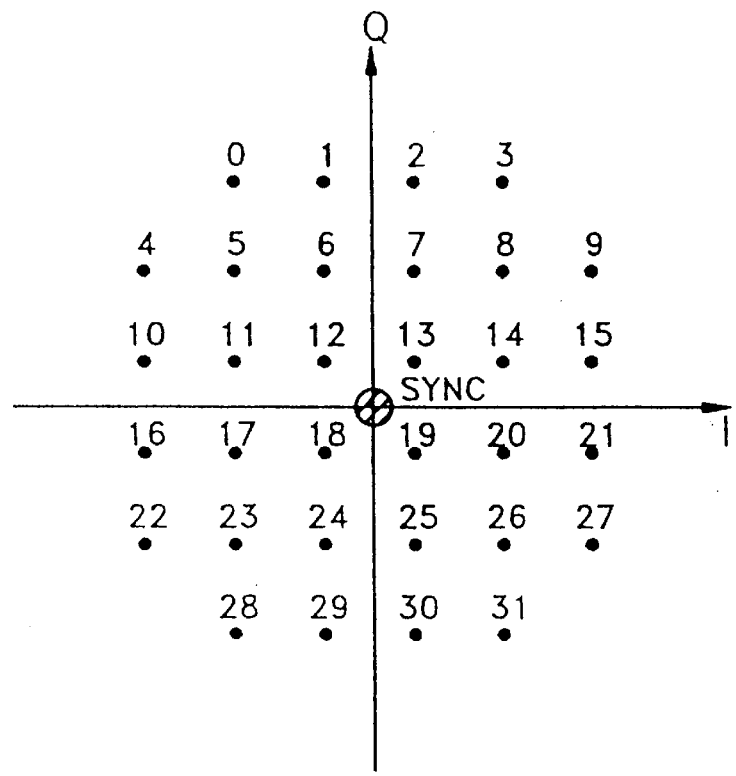
FIG. 16 is a signal constellation diagram of the mapper circuit shown in FIG. 10.

The adder/comparator/selector circuit 232 adds the evaluated values of both the branch evaluated value computing circuit 231 and the state memory 233, compares the branch evaluated values in accordance with the respective states on the Trellis diagram representing the state diagram shown in FIG. 16 in a time scale, selects the least of the evaluated values to store it in the state memory 233 again, transfers the information on the surviving paths of the respective states to the non-trace path memory 234 to thereby output decoded final data.

In other words, the adder/comparator/selector circuit 232 adds a current evaluated value to an existing evaluated value of paths, selects the least of the evaluated values to extract a path select signal and a newly evaluated value.

Figure 13:
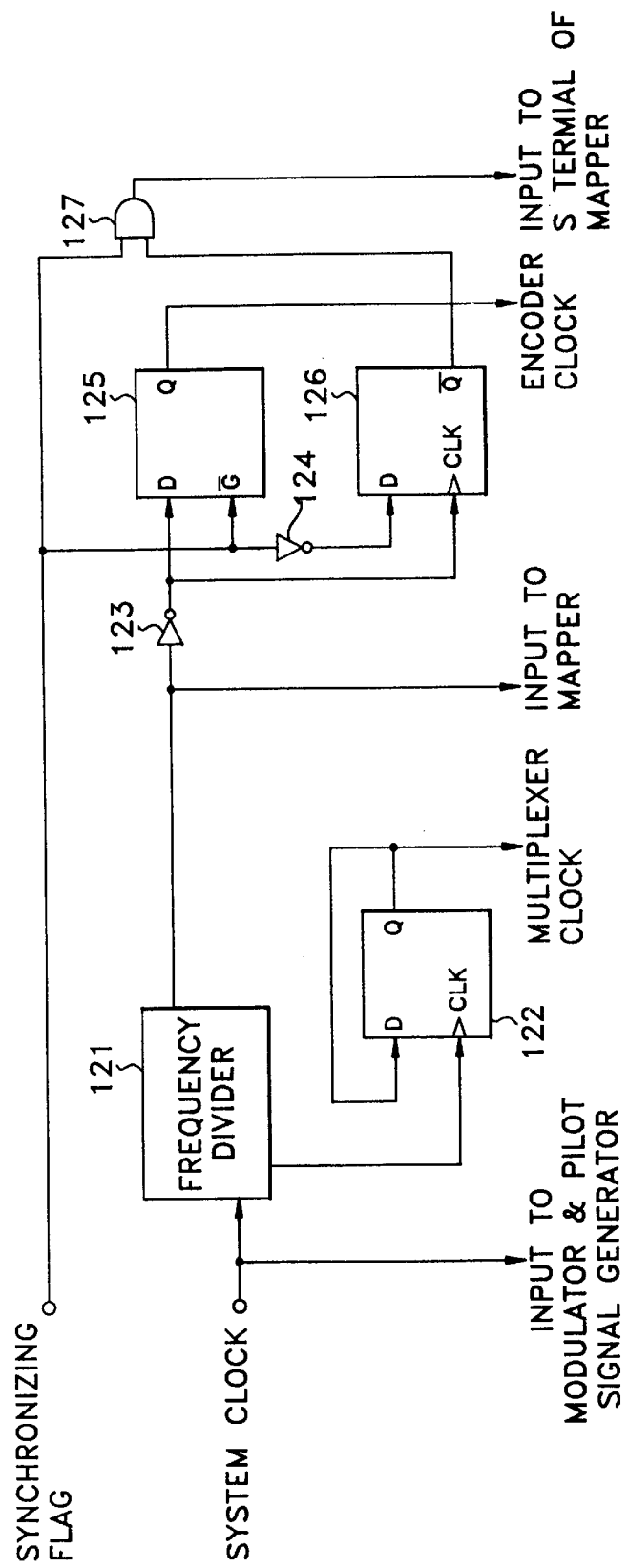
FIG. 13 is a detailed circuit diagram of the synchronizing signal controller shown in FIG. 10.

FIG. 13 is a detailed circuit diagram of the synchronizing signal controller shown in FIG. 10, wherein a reference numeral 121 denotes a frequency-divider, 122, 125 and 126 are D flip-flops, 123 and 124 are inverters and 127 is an AND gate. The operation of the synchronizing signal controller shown in FIG. 13 will be explained with reference to FIGS. 14A to 14E.

Assuming that a system clock is Q MHz, the system clock is frequency-divided through the frequency-divider 121 by a frequency division ratio of Q/n, the frequency-divided clock signal (shown in FIG. 14B) is input to the mapper circuit 143 shown in FIG. 10 as a clock signal and at the same time input to the clock terminal CLK of the D flip-flop 122 is frequency-divided by two and finally is input as a clock signal of the multiplexer 130 shown in FIG. 10. Preferably, the output of the inverter 123 is input to the input terminal D of the D flip-flop 125 having a latch function and the clock terminal CLK of the D flip-flop 126.

Figure 14A:
FIGS. 14A to 14E are operational timing charts of the synchronizing signal controller shown in FIG. 13.
Figure 14B:
Figure 14C:

The synchronizing flag signal shown in FIG. 14A is input to an enabling terminal $\overline{G}$ of the D flip-flop 125 and also input to the input terminal D of the D flip-flop 126 via inverter 124.

Figure 14D:
Figure 14E:

The output (shown in FIG. 14C) of the D flip-flop 125 is input as a clock signal the convolution encoder 142 shown in FIG. 10, the inverted output $\overline{Q}$ of the D flip-flop 126 as shown in FIG. 14D is logically multiplied by the synchronizing flag signal shown in FIG. 14A, through AND gate 127, and the output signal shown in FIG. 14E, is input to the enabling terminal S of the mapper circuit 143 shown in FIG. 10. Preferably, the system clock is input as the address clock of the modulator 153 and the pilot signal generator 161 shown in FIG. 10.

Figure 15:
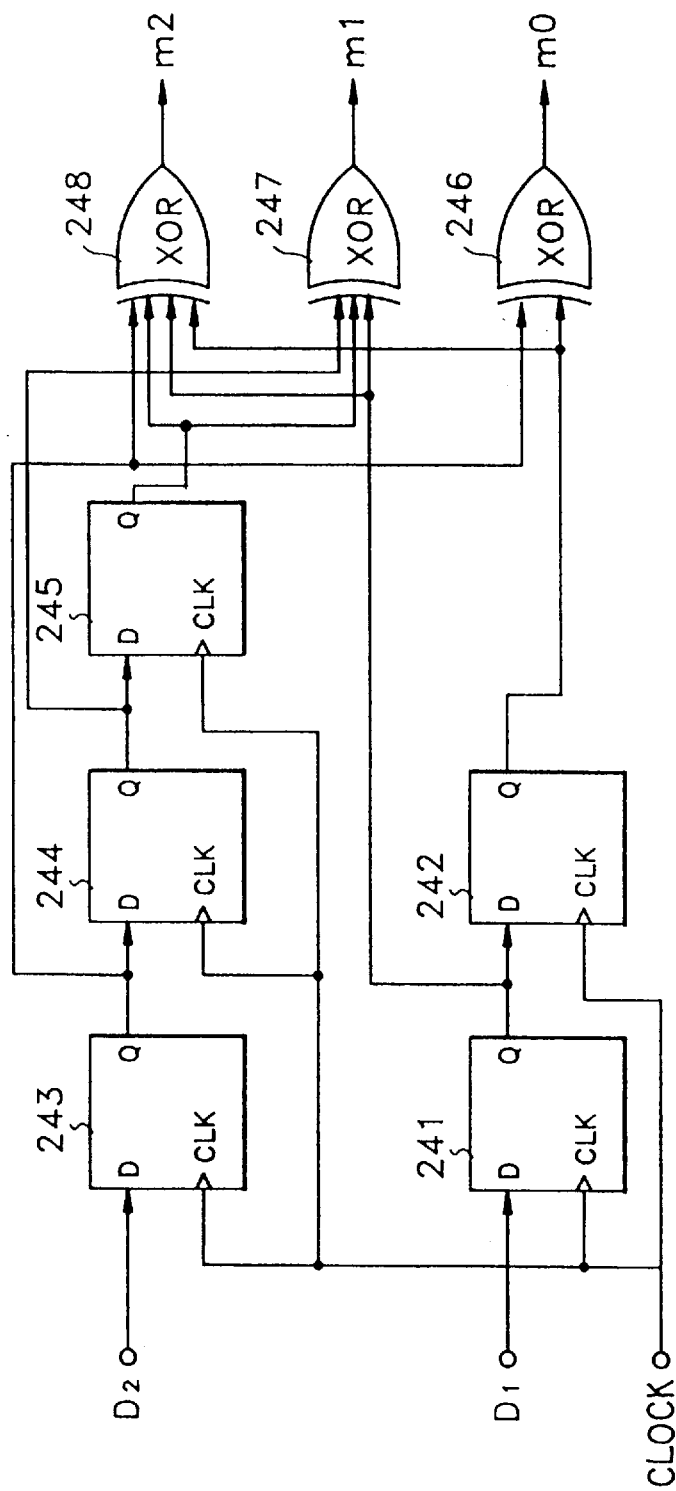
FIG. 15 is a detailed circuit diagram of the convolution encoder shown in FIG. 10.

Meanwhile, while the synchronizing flag signal shown in FIG. 14A is "1," the convolution encoder 152 does not operate. While the synchronizing flag signal is "0," 2-bit data input to the convolution encoder 142 are coded and output as 3 bits. The detailed circuit diagram of the convolution encoder 142 is as shown in FIG. 15, wherein numerals 241 to 245 are D flip-flops, 246 to 248 are exclusive-OR gates (XOR). The operation of FIG. 15 will be explained with reference to FIGS. 16 to 18.

The clock signal (shown in FIG. 14C) output from the D flip-flop 125 is input to the clock terminal CLK of the D flip-flops 241 to 245.

The 2-bit data output from the multiplexer 130 are input to the input terminal of the D flip-flops 241 and 243.

The output of the D flip-flop 241 is input to the input terminal D of the D flip-flop 242 and a first input terminal of the XOR 247, while the output of the D flip-flop 242 is input to a first input terminal of the XOR 246 and a first input terminal of the XOR 248.

The output of the D flip-flop 243 is input to the input terminal D of the D flip-flop 244, a second input terminal of the XOR 246 and a fourth input terminal of the XOR 248 while the output of the D flip-flop 244 is input to the input terminal D of the D flip-flop 245 and a third input terminal of the XOR 247. The output of the D flip-flop 245 is input to a second input terminal of the XOR 247 and a third input terminal of the XOR 248. The output of the XOR 246 becomes the lowest encoded bit, the output of the XOR 247 becomes an upper bit and the output of the XOR 248 becomes the uppermost bit.

The logic states of the input and output according to the present state and next state of the convolution encoder shown in FIG. 15 are as follows.

| (Logic table) | | | | | | | | | | |
|---|---|---|---|---|---|---|---|---|---|---|
| INPUT | | PRESENT STATE | | | NEXT STATE | | | OUTPUT | | |
| 0 | 0 | 0 | 0 | 0 | 0 | 0 | 0 | 0 | 0 | 0 |
| 0 | 1 | 0 | 0 | 1 | 0 | 0 | 0 | 0 | 0 | 0 |
| 1 | 0 | 0 | 1 | 0 | 0 | 0 | 0 | 0 | 0 | 0 |
| 1 | 1 | 0 | 1 | 1 | 0 | 0 | 0 | 1 | 1 | 1 |
| 0 | 0 | 1 | 0 | 0 | 0 | 1 | 0 | 0 | 0 | 1 |
| 0 | 1 | 1 | 0 | 1 | 0 | 1 | 0 | 0 | 0 | 1 |

-continued (Logic table)

| INPUT | | | PRESENT STATE | | | NEXT STATE | | | OUTPUT | |
|---|---|---|---|---|---|---|---|---|---|---|
| 1 | 0 | 1 | 1 | 0 | 0 | 1 | 0 | 1 | 1 | 0 |
| 1 | 1 | 1 | 1 | 1 | 0 | 1 | 0 | 0 | 0 | 0 |
| 0 | 0 | 0 | 0 | 0 | 0 | 1 | 1 | 1 | 1 | 1 |
| 0 | 1 | 0 | 0 | 1 | 0 | 0 | 1 | 1 | 0 | 1 |
| 1 | 0 | 0 | 1 | 0 | 0 | 0 | 1 | 0 | 1 | 0 |
| 1 | 1 | 0 | 1 | 1 | 0 | 0 | 1 | 1 | 0 | 0 |
| 0 | 0 | 1 | 0 | 0 | 0 | 1 | 1 | 0 | 1 | 1 |
| 0 | 1 | 1 | 0 | 1 | 0 | 1 | 1 | 1 | 1 | 0 |
| 1 | 0 | 1 | 1 | 0 | 0 | 1 | 1 | 0 | 1 | 1 |
| 1 | 1 | 1 | 1 | 1 | 0 | 1 | 1 | 0 | 1 | 0 |
| 0 | 0 | 0 | 0 | 0 | 1 | 0 | 0 | 1 | 0 | 1 |
| 0 | 1 | 0 | 0 | 1 | 1 | 0 | 0 | 1 | 1 | 0 |
| 1 | 0 | 0 | 1 | 0 | 1 | 0 | 0 | 0 | 0 | 1 |
| 1 | 1 | 0 | 1 | 1 | 1 | 0 | 0 | 0 | 1 | 0 |
| 0 | 0 | 1 | 0 | 0 | 1 | 1 | 0 | 0 | 1 | 1 |
| 0 | 1 | 1 | 0 | 1 | 1 | 1 | 0 | 1 | 1 | 1 |
| 1 | 0 | 1 | 1 | 0 | 1 | 1 | 0 | 0 | 1 | 0 |
| 1 | 1 | 1 | 1 | 1 | 1 | 0 | 1 | 1 | 0 | 0 |
| 0 | 0 | 0 | 0 | 0 | 1 | 0 | 1 | 0 | 1 | 1 |
| 0 | 1 | 0 | 0 | 1 | 0 | 1 | 1 | 0 | 0 | 0 |
| 1 | 0 | 0 | 1 | 0 | 1 | 0 | 1 | 0 | 1 | 1 |
| 1 | 1 | 0 | 1 | 1 | 0 | 1 | 1 | 0 | 0 | 0 |
| 0 | 0 | 1 | 0 | 0 | 1 | 1 | 1 | 1 | 0 | 0 |
| 0 | 1 | 1 | 0 | 1 | 1 | 1 | 1 | 0 | 0 | 1 |
| 1 | 0 | 1 | 1 | 0 | 1 | 1 | 1 | 1 | 0 | 0 |
| 1 | 1 | 1 | 1 | 1 | 1 | 1 | 1 | 0 | 0 | 1 |

The convolution encoder 142 is devised so as to preclude a catastrophe phenomenon wherein an error is spread infinitely so that an error rate is reduced at the time of decoding. The n+1 bits output through the convolution encoder 142 are mapped as in the signal constellation shown in FIG. 16 to be output through I and Q channels. The origin in FIG. 16 is where synchronizing data are mapped. The synchronizing data are mapped at the origin while the synchronizing flag signal input by the synchronizing signal controller 120 through the convolution encoder 142 is not "1," whereby the synchronizing signal is less affected by an error to facilitate the detection of the synchronizing flag signal from the synchronizing flag signal detector 220.

Figure 17:
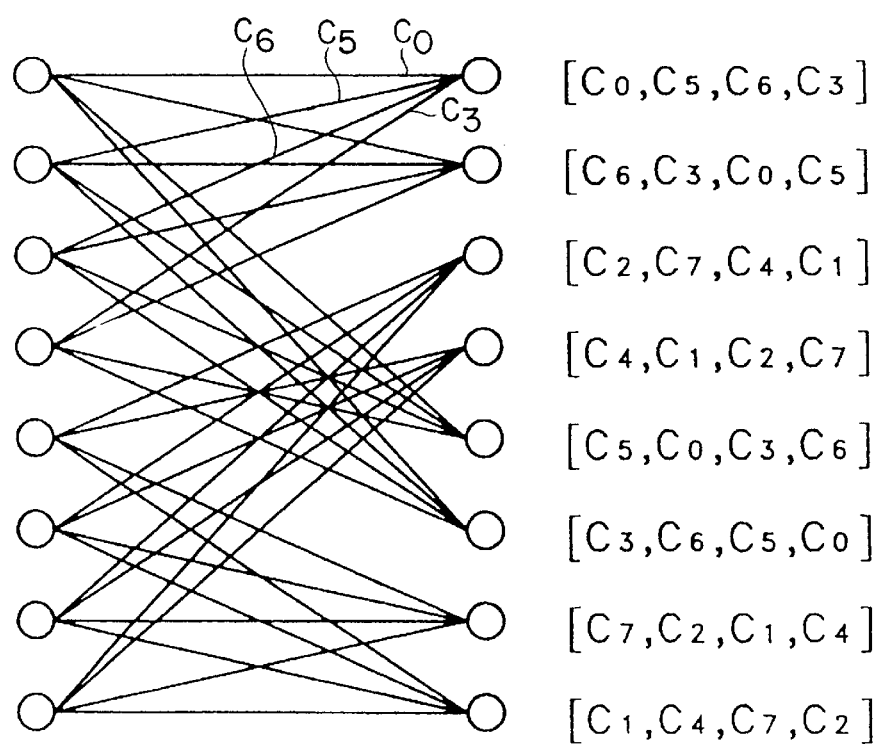
FIG. 17 is a state diagram of the mapper circuit shown in FIG. 10.

In the signal constellation illustrated in FIG. 16, the signals are mapped so that coding gains are increased in the manner that the parallel shifted portions are set-partitioned farthest and the shifted signal in the same state is set partitioned far, among the signals encoded in accordance with the state diagram of FIG. 17.

The respective sets partitioned into 8 sets are as follows.
$C_0$=[00000(0), 01101(13), 10111(23), 11011(27)],
$C_1$=[00001(1), 01010(10), 10110(14), 11000(24)],
$C_2$=[00101(5), 01001(9), 10011(19), 11100(28)],
$C_3$=[00100(4), 01000(8), 10010(18), 11111(31)],
$C_4$=[00011(3), 01100(12), 10110(22), 11010(26)],
$C_5$=[00110(6), 10000(16), 10100(20), 11101(29)],
$C_6$=[00010(2), 01011(11), 10000(15), 11001(25)] and
$C_7$=[00111(7), 10001(17), 10101(21), 11110(30)]

Figure 18:
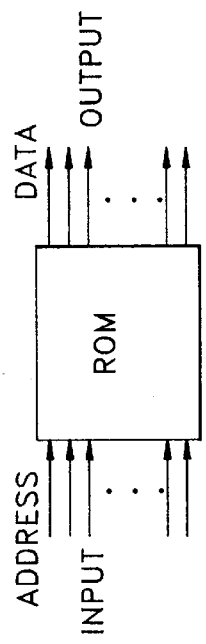
FIG. 18 is a configurational diagram of the non-linear mapper circuit shown in FIG. 10 at the time of a ROM embodiment.

FIG. 18 shows a structure of the ROM table when the mapper is constructed as a ROM.

Figure 19:
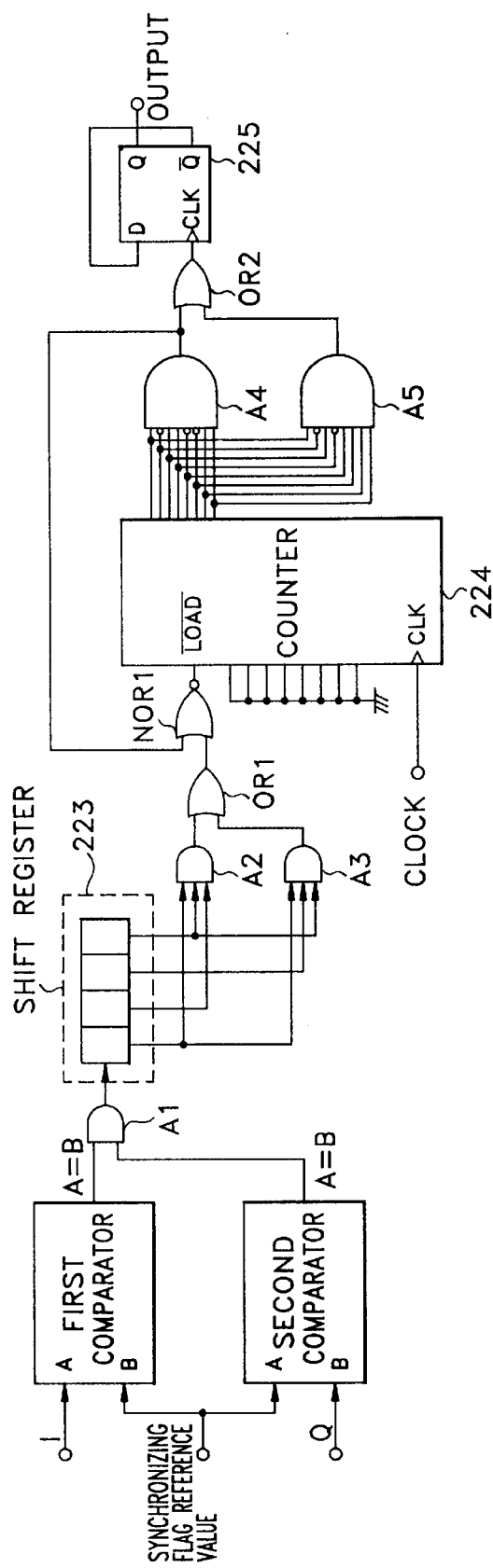
FIG. 19 is a detailed circuit diagram of the synchronizing flag detector shown in FIG. 10.

FIG. 19 is a detailed circuit diagram of the synchronizing flag detector shown in FIG. 10, wherein numerals 221 and 222 are first and second comparators, 223 is a shift register, 224 is a counter, 225 is a D flip-flop, A1 to A5 are AND gates, N1 is a NOR gate, OR1 and OR2 are OR gates. The operation of the synchronizing flag detector shown in FIG. 19 will be explained.

Referring to FIG. 19, the I and Q channel data output through the first and second low pass equalizers 212 and 213 shown in FIG. 10 are compared with the specific synchronization patterned data by the comparators 221 and 222 and the compared values are logically multiplied in the first AND gate A1 to be input to the shift register 223. The synchronization patterned data which are predetermined synchronizing flag reference values, are "0000" since they are mapped at the origin. The value of "1111", "1101" or "1011" of the shift register 223 is detected in the second and third AND gates A2 and A3 and input to the load port $\overline{\text{LOAD}}$ of the counter 224 through the OR gate OR1 and NOR gate NOR1.

If a signal is input to the load port $\overline{\text{LOAD}}$ of the counter 224, the counter 224 counts as the number of clock pulse that synchronizing flag signals are repeated. If the counted values are data corresponding to the points at which the "high" interval of the synchronizing flag signal starts and ends, they are input to the clock of the D flip-flop 225 through the fourth and fifth AND gates A4 and A5 and the second OR gate OR2 and a synchronizing flag signal is output from the D flip-flop 225. The signal counted as the frequency of the synchronizing flag signal is negative logic summed with the signal compared by the comparators 221 and 222 through the NOR gate. NOR to be loaded to the load port $\overline{\text{LOAD}}$. The synchronizing flag signal is input to a Viterbi decoder.

Such structures as described in the embodiments of the present invention are expected to have the following effects.

The frequency bands having a good carrier-to-noise ratio (CNR) in a magnetic recording and reproducing channel can be used by means of a multiple valued level modulation method. Preferably, the system can be realized easily by performing the modulation by generating a carrier wave signal (also called a carrier signal) synchronized with a system clock and performing the modulation digitally. The recording efficiency can advantageously be increased by extending frequency bands to the maximum permissible extent of the CNR and BER of a reproduced signal.

Furthermore, the synchronizing data can be easily detected after demodulation, by inserting a synchronizing signal and mapping the value of the synchronizing signal at the origin on a signal constellation diagram in one embodiment of the present invention, and the error rate can be improved by using the detected synchronizing data in decoding.

As stated above, the digital signal magnetic recording and reproducing apparatus according to the present invention increases frequency utilization efficiency by adopting a multiple valued digital modulation method, which is used in the communication field, having a high recording efficiency with a low error rate for the reproduced data and improves a recording bit rate without increasing recording channels, thereby enabling high density recording.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:
1. A digital signal magnetic recording and reproducing apparatus, comprising:
   an encoder for converting an input digital signal into a multiple valued digital signal;
   a modulator for sampling a carrier signal according to a predetermined frequency and quantizing the carrier signal magnitude according to a quantization level to thereby convert the carrier signal into a digital carrier signal, and for quadrature-amplitude-modulating and phase-shift keying-modulating said multiple valued digital signal according to the digital carrier signal to thereby produce a modulated digital signal;

a pilot signal mixer for generating a pilot signal and adding the pilot signal to said modulated digital signal;

a recording controller for forming a magnetized signal suitable for a magnetic recording medium from the modulated digital signal mixed with said pilot signal, said recording controller comprising:
  a digital-to-analog (D/A) converter for generating an analog signal from said pilot signal and said modulated digital signal;
  a recording amplifier for amplifying the output analog signal to produce an amplified analog signal;
  a bias signal generator for generating a bias signal; and
  an adder for adding the bias signal to said amplified analog signal;

a reproducing controller for outputting the modulated digital signal wherein signal distortion and deterioration produced in transmission are corrected, from the magnetized signal reproduced from said magnetic recording medium;

a carrier wave restorer for generating a clock signal having the carrier signal frequency responsive to detection of said pilot signal in said reproduced magnetized signal;

a demodulator for sampling the carrier signal restored by the carrier wave restorer according to a predetermined frequency and quantizing the carrier signal magnitude according to a quantization level to thereby convert the carrier signal into a digital carrier signal, and for demodulating the modulated digital signal output from the reproducing controller according to the digital carrier signal to thereby produce a demodulated output signal; and a decoder for providing original digital data by Viterbi-decoding convolutionally coded data from the demodulator output of said demodulator, wherein said modulator comprises:
  a first ROM for storing a first digital carrier signal, where a first carrier signal expressed as sine components is sampled according to a predetermined frequency and is quantized according to a quantization level to thereby convert the first carrier signal into said first digital carrier signal;
  a second ROM for storing a second digital carrier signal, wherein a second carrier signal expressed as cosine components is sampled according to a predetermined frequency and is quantized according to a quantization level to thereby convert the second carrier signal into said second digital carrier signal;
  a first multiplier for multiplying the first digital carrier signal output from said first ROM by in-phase (I) channel data output from said encoder;
  a second multiplier for multiplying the second digital carrier signal output from said second ROM by quadrature-phase (Q) channel data output from said encoder; and
  a first adder for adding the outputs of said first and second multipliers.

2. A digital signal magnetic recording and reproducing apparatus, comprising:
an encoder for converting an input digital signal into a multiple valued digital signal;

a modulator for sampling a carrier signal according to a predetermined frequency and quantizing the carrier signal magnitude according to a quantization level to thereby convert the carrier signal into a digital carrier signal, and for quadrature-amplitude-modulating and phase-shift keying-modulating said multiple valued digital signal according to the digital carrier signal to thereby produce a modulated digital signal;

a pilot signal mixer for generating a pilot signal and adding the pilot signal to said modulated digital signal;

a recording controller for forming a magnetized signal suitable for a magnetic recording medium from the modulated digital signal mixed with said pilot signal, said recording controller comprising:
  a digital-to-analog (D/A) converter for generating an analog signal from said pilot signal and said modulated digital signal;
  a recording amplifier for amplifying the output analog signal to produce an amplified analog signal;
  a bias signal generator for generating a bias signal; and
  an adder for adding the bias signal to said amplified analog signal;

a reproducing controller for outputting the modulated digital signal wherein signal distortion and deterioration produced in transmission are corrected, from the magnetized signal reproduced from said magnetic recording medium;

a carrier wave restorer for generating a clock signal having the carrier signal frequency responsive to detection of said pilot signal in said reproduced magnetized signal;

a demodulator for sampling the carrier signal restored by the carrier wave restorer according to a predetermined frequency and quantizing the carrier signal magnitude according to a quantization level to thereby convert the carrier signal into a digital carrier signal, and for demodulating the modulated digital signal output from the reproducing controller according to the digital carrier signal to thereby produce a demodulated output signal; and a decoder for providing original digital data by Viterbi-decoding convolutionally coded data from the demodulator output of said demodulator;

wherein said modulator comprises:
  first and second pulse shaping filters for wave-shaping and band-restricting I and Q channel data output from said encoder;
  a first carrier signal generator having a first ROM wherein a first carrier signal expressed as sine components is stored and a second ROM wherein a second carrier signal expressed as cosine components is stored;
  a first balanced-modulator having a first AND gate combination circuit for combining the I channel data output from said encoder with a first carrier signal output from said first ROM, a first adder combination circuit for adding the output of the first AND gate combination circuit and a first latch for temporarily storing the output of the first adder combination circuit;
  a second balanced-modulator having a second AND gate combination circuit for combining the Q channel data output from said encoder with a second carrier signal output from said second ROM, a second adder combination circuit for adding the output of the second AND gate combination circuit and a second latch for temporarily storing the output of the second adder combination circuit;

a first adder having a third adder combination circuit for adding respective outputs of said first and second latches representing I modulated signal of the I channel and Q modulated signal of the Q channel; and a third latch for temporarily storing the quadrature-amplitude-modulated signal thereby produced in said third adder combination circuit.

3. A digital signal magnetic recording and reproducing apparatus comprising:

an encoder for converting an input digital signal into a multiple valued digital signal;

a modulator for sampling a carrier signal according to a predetermined frequency and quantizing the carrier signal magnitude according to a quantization level to thereby convert the carrier signal into a digital carrier signal, and for quadrature-amplitude-modulating and phase-shift keying-modulating said multiple valued digital signal according to the digital carrier signal to thereby produce a modulated digital signal;

a pilot signal mixer for generating a pilot signal and adding the pilot signal to said modulated digital signal;

a recording controller for forming a magnetized signal suitable for a magnetic recording medium from the modulated digital signal mixed with said pilot signal, said recording controller comprising:

a digital-to-analog (D/A) converter for generating an analog signal from said pilot signal and said modulated digital signal;

a recording amplifier for amplifying the output analog signal to produce an amplified analog signal;

a bias signal generator for generating a bias signal; and an adder for adding the bias signal to said amplified analog signal;

a reproducing controller for outputting the modulated digital signal wherein signal distortion and deterioration produced in transmission are corrected, from the magnetized signal reproduced from said magnetic recording medium;

a carrier wave restorer for generating a clock signal having the carrier signal frequency responsive to detection of said pilot signal in said reproduced magnetized signal;

a demodulator for sampling the carrier signal restored by the carrier wave restorer according to a predetermined frequency and quantizing the carrier signal magnitude according to a quantization level to thereby convert the carrier signal into a digital carrier signal, and for demodulating the modulated digital signal output from the reproducing controller according to the digital carrier signal to thereby produce a demodulated output signal; and a decoder for providing original digital data by Viterbi-decoding convolutionally coded data from the demodulator output of said demodulator;

wherein said demodulator comprises:

a first ROM for storing a first digital carrier signal, wherein a first carrier signal expressed as sine components read in accordance with a clock signal corresponding to a restored carrier signal is sampled according to a predetermined frequency and the first carrier signal magnitude is quantized according to a quantization level to thereby convert the first carrier signal into said first digital carrier signal;

a second ROM for storing a second digital carrier signal, wherein a second carrier signal expressed as cosine components read in accordance with said clock signal corresponding to said restored carrier signal is sampled according to a predetermined frequency and the second carrier signal magnitude is quantized according to a quantization level to thereby convert the second carrier signal into said second digital carrier signal;

a first multiplier for multiplying the modulated digital signal output from said reproducing controller by the first digital carrier signal output from said first ROM;

a second multiplier for multiplying the modulated digital signal output from said reproducing controller by the second digital carrier output from said second ROM; and an adder for adding respective outputs of said first and second multipliers.

4. A digital signal magnetic recording and reproducing apparatus comprising:

an encoder for converting an input digital signal into a multiple valued digital signal;

a modulator for sampling a carrier signal according to a predetermined frequency and quantizing the carrier signal magnitude according to a quantization level to thereby convert the carrier signal into a digital carrier signal, and for quadrature-amplitude-modulating and phase-shift keying-modulating said multiple valued digital signal according to the digital carrier signal to thereby produce a modulated digital signal;

a pilot signal mixer for generating a pilot signal and adding the pilot signal to said modulated digital signal;

a recording controller for forming a magnetized signal suitable for a magnetic recording medium from the modulated digital signal mixed with said pilot signal, said recording controller comprising:

a digital-to-analog (D/A) converter for generating an analog signal from said pilot signal and said modulated digital signal;

a recording amplifier for amplifying the output analog signal to produce an amplified analog signal;

a bias signal generator for generating a bias signal; and an adder for adding the bias signal to said amplified analog signal;

a reproducing controller for outputting the modulated digital signal wherein signal distortion and deterioration produced in transmission are corrected, from the magnetized signal reproduced from said magnetic recording medium;

a carrier wave restorer for generating a clock signal having the carrier signal frequency responsive to detection of said pilot signal in said reproduced magnetized signal;

a demodulator for sampling the carrier signal restored by the carrier wave restorer according to a predetermined frequency and quantizing the carrier signal magnitude according to a quantization level to thereby convert the carrier signal into a digital carrier signal, and for demodulating the modulated digital signal output from the reproducing controller according to the digital carrier signal to thereby produce a demodulated output signal;

a decoder for providing original digital data by Viterbi-decoding convolutionally coded data from the demodulator output of said demodulator; and a noise eliminator for restricting bands and decreasing clock frequencies so as to improve a signal-to-noise ratio of the demodulator output;

wherein said demodulator comprises:
   a carrier signal generator having a first ROM from which a first carrier signal expressed as sine components is read in accordance with a clock signal corresponding to a restored carrier signal and a second ROM from which a second carrier signal expressed as cosine components is read in accordance with said clock signal corresponding to said restored carrier signal;
   a balanced-modulator having a first AND gate combination circuit for combining the modulated digital signal output from said reproducing controller with the first carrier signal output from said first ROM, a first adder combination circuit for adding the output of the first AND gate combination circuit and a first latch for temporarily storing an output of the first adder combination circuit;
   a second balanced-modulator having a second AND gate combination circuit for combining the modulated digital signal output from said reproducing controller with the second carrier signal output from said second ROM, a second adder combination circuit for adding the output of the second AND gate combination circuit and a second latch for temporarily storing an output of the second adder combination circuit; and
   first and second matching filters for restricting output bands of said first and second balanced-modulators.

5. A digital signal magnetic recording and reproducing apparatus, as claimed in claim 4, wherein said noise eliminator comprises:
   first and second decimators for decreasing a clock frequency to thereby improve a signal-to-noise (S/N) ratio of respective outputs of the first and second matching filters;
   first and second base-band equalizers for compensating respective output signals of said first and second decimators; and
   third and fourth decimators for redecimating respective outputs of said first and second base-band equalizers to decrease the clock frequency.

6. A digital signal magnetic recording and reproducing apparatus comprising:
   an encoder for converting an input digital signal into a multiple valued digital signal;
   a modulator for sampling a carrier signal according to a predetermined frequency and quantizing the carrier signal magnitude according to a quantization level to thereby convert the carrier signal into a digital carrier signal, and for quadrature-amplitude-modulating and phase-shift keying-modulating said multiple valued digital signal according to the digital carrier signal to thereby produce a modulated digital signal;
   a pilot signal mixer for generating a pilot signal and adding the pilot signal to said modulated digital signal;
   a recording controller for forming a magnetized signal suitable for a magnetic recording medium from the modulated digital signal mixed with said Pilot signal, said recording controller comprising:
      a digital-to-analog (D/A) converter for generating an analog signal from said pilot signal and said modulated digital signal;
      a recording amplifier for amplifying the output analog signal to produce an amplified analog signal;
      a bias signal generator for generating a bias signal; and
      an adder for adding the bias signal to said amplified analog signal;
   a reproducing controller for outputting the modulated digital signal wherein signal distortion and deterioration produced in transmission are corrected, from the magnetized signal reproduced from said magnetic recording medium;
   a carrier wave restorer for generating a clock signal having the carrier signal frequency responsive to detection of said pilot signal in said reproduced magnetized signal;
   a demodulator for sampling the carrier signal restored by the carrier wave restorer according to a predetermined frequency and quantizing the carrier signal magnitude according to a quantization level to thereby convert the carrier signal into a digital carrier signal, and for demodulating the modulated digital signal output from the reproducing controller according to the digital carrier signal to thereby produce a demodulated output signal;
   a decoder for providing original digital data by Viterbi-decoding convolutionally coded data from the demodulator output of said demodulator;
   a noise eliminator directly coupling said demodulator to said decoder for restricting bands and decreasing clock frequencies so as to improve a signal-to-noise ratio of the demodulator output; and
   a sync signal detector operatively connected to said decoder for detecting synchronizing signals in an output of said noise eliminator,
wherein said reproducing controller comprises:
   a reproducing amplifier for amplifying the magnetized signal reproduced from said magnetic recording medium to produce an amplified magnetized signal;
   a phase shifter directly connected to said reproducing amplifier for phase shifting said amplified magnetized signal to compensate for phase shift due to differential characteristics of a magnetic channel during recording;
   a low-pass filter directly connected to said phase shifter for filtering the amplified magnetized signal output from said phase shifter;
   an analog-to-digital (A/D) converter directly connected to said low-pass filter for converting said low-pass filter output into digital signal form; and
   a band-pass equalizer directly connected to said A/D converter for correcting signal distortion and deterioration produced in transmission by receiving said A/D converter output,
wherein said carrier wave restorer comprises:
   a band-pass filter connected to an output of said phase shifter for detecting a pilot signal of ROM signals output from said phase shifter; and
   a phase locked loop directly connected to said band-pass filter for generating a clock signal at a carrier signal frequency from said band-pass filter output, said phase locked loop providing said clock signal to said A/D converter,
wherein said demodulator comprises:
   a second carrier signal generator having a first ROM from which a first carrier signal expressed as sine components is read in accordance with said clock signal and a second ROM from which a second carrier signal expressed as cosine components is read in accordance with said clock signal;

a first balanced-modulator having a first AND gate combination circuit for combining the modulated digital signal output from said band-pass equalizer with the first carrier signal output from said first ROM, a first adder combination circuit for adding the output of the first AND gate combination circuit and a first latch for temporarily storing an output of the first adder combination circuit;

a second balanced-modulator having a second AND gate combination circuit for combining the modulated digital signal output from said band-pass equalizer with the second carrier signal output from said second ROM, a second adder combination circuit for adding the output of the second AND gate combination circuit and a second latch for temporarily storing an output of the second adder combination circuit; and first and second matching filters for restricting output bands of said first and second balanced-modulators, and wherein said noise eliminators comprises:

first and second decimators for decreasing a clock frequency to thereby improve a signal-to-noise (S/N) ratio of respective outputs of the first and second matching filters;

first and second base-band equalizers for compensating respective output signals of said first and second decimators; and third and fourth decimators directly connected to said decoder for re-decimating respective outputs of said first and second base-band equalizers to decrease the clock frequency.

* * * * *